(12) United States Patent
Cavanagh

(10) Patent No.: US 8,126,044 B2
(45) Date of Patent: Feb. 28, 2012

(54) PASSIVE SYSTEM AND METHOD TO EQUALIZE DISTORTION IN AN RF SATELLITE CHAIN

(75) Inventor: Eduardo Cavanagh, Buenos Aires (AR)

(73) Assignee: The DIRECTV Group, Inc., El Segundo, CA (US)

( * ) Notice: Subject to any disclaimer, the term of this patent is extended or adjusted under 35 U.S.C. 154(b) by 1520 days.

(21) Appl. No.: 11/586,383

(22) Filed: Oct. 25, 2006

(65) Prior Publication Data

US 2008/0102751 A1    May 1, 2008

(51) Int. Cl.
*H03H 7/30* (2006.01)
*H03K 5/159* (2006.01)

(52) U.S. Cl. .................. 375/232; 375/233; 375/234

(58) Field of Classification Search .......... 375/229, 375/232, 233; 455/3.01, 3.02
See application file for complete search history.

(56) References Cited

U.S. PATENT DOCUMENTS

| | | | |
|---|---|---|---|
| 6,061,393 A * | 5/2000 | Tsui et al. ............... | 375/224 |
| 6,366,613 B2 * | 4/2002 | Sommer et al. ............ | 375/232 |
| 6,385,237 B1 | 5/2002 | Tsui et al. | |
| 6,487,295 B1 * | 11/2002 | Lofgren et al. ............ | 381/71.12 |
| 6,771,318 B1 | 8/2004 | Ninomiya | |
| 6,775,322 B1 * | 8/2004 | Zangi et al. ............... | 375/232 |
| 6,791,995 B1 * | 9/2004 | Azenkot et al. ............ | 370/436 |
| 7,423,699 B2 * | 9/2008 | Vorenkamp et al. ......... | 348/726 |
| 7,515,895 B2 * | 4/2009 | Vorenkamp et al. ......... | 455/307 |
| 7,593,696 B2 * | 9/2009 | Fischer .................... | 455/87 |
| 2001/0030585 A1 * | 10/2001 | Jansson et al. ............ | 333/17.1 |
| 2001/0043650 A1 * | 11/2001 | Sommer et al. ............ | 375/232 |
| 2004/0095994 A1 * | 5/2004 | Dowling .................. | 375/222 |
| 2004/0096022 A1 * | 5/2004 | Zhang .................... | 375/353 |
| 2005/0260962 A1 | 11/2005 | Nazrul et al. | |
| 2006/0140262 A1 * | 6/2006 | Kuijk et al. ............... | 375/232 |
| 2007/0223571 A1 * | 9/2007 | Viss ...................... | 375/233 |

OTHER PUBLICATIONS

Ayal Shoval; "Analog Adaptive Filtering Techniques for High-Speed Data Communications", Thesis Paper, 1995.*
Non-final Office Action dated May 8, 2009 in U.S. Appl. No. 11/586,414, filed Oct. 25, 2006 by Eduardo Cavanagh.

* cited by examiner

*Primary Examiner* — Khanh C Tran
*Assistant Examiner* — Qutbuddin Ghulamali

(57) ABSTRACT

A system and method for configuring an equalizer 48 for a transmission link includes a computer 82 that forms a mathematical model of an analog equalizer having a plurality of mathematical model filter stages. The computer 82 determines a desired response and tunes each of the plurality of mathematical model filter stages toward the desired response to form a plurality of model filter parameters to compensate for distortions in the transmission link. The equalizer 48 is coupled to the RF chain. The plurality of filter stages is tuned in response to the filter parameters. The RF signals are broadcast in response to analog equalizer.

26 Claims, 21 Drawing Sheets

PASSIVE SYSTEM AND METHOD TO EQUALIZE DISTORTION IN AN RF SATELLITE CHAIN

CROSS-REFERENCE TO RELATED APPLICATIONS

This application is generally related to U.S. patent application Ser. No. 11/586,414 filed on the same date as this application, the disclosure of which is incorporated herein by reference.

FIELD

The present disclosure relates generally to a satellite transponder system and, more particularly, to a method of correcting distortion in a satellite transmission system.

BACKGROUND

The statements in this section merely provide background information related to the present disclosure and may not constitute prior art.

In the field of satellite broadcasting, and, more particularly, to satellite broadcasting television signals, the quality of emitted signals may vary. Various sources of a degradation in quality exist. Equipment changes, operation and installation errors, or interference all can result in the degradation of the received signal. Various places in the radio frequency (RF) uplink chain may contribute to a degradation in quality of the signal. Throughout the RF chain, the electronics of the different elements, plus the atmosphere, may distort the shape of the emitted signals at the modulator. Various instruments may be used to provide an RF analysis of the incoming signal. The machines are typically stand-alone machines that are used to receive the signals. Such systems are typically very expensive and are not practical for field deployment.

There is also a need to compensate for the above-mentioned distortions in the signal. Analog equalizers are commonly used to attempt to equalize the signal. Analog equalizers typically have several filters in cascade. Each filter of the sequence is then tuned to a particular bandwidth of the total desired equalizer response, one at a time. The problem with this approach is that the response of the equalizer for a particular frequency band is due not only to the specific filter used in that region, but it is also dependent upon the response of the other filters. Therefore, when a particular filter is tuned, previously-tuned filters must be readjusted in the hopes that the particular iteration will end up to be a satisfactory solution. Typically, a satisfactory solution is not obtained. Oftentimes, a predetermined performance level is not reached and, therefore, after many hours of work, the equalizer may yet be far from its optimum operating point.

It would, therefore, be desirable to provide a way to determine distortions in the RF system and provide a method for equalizing the distortions in the system.

SUMMARY

In one aspect of the disclosure, a system for analyzing a broadcast system includes an integrated receiver decoder generating a baseband modulated radio frequency (RF) signal and digitizing the RF signal to form a digitized signal. A data capture module is coupled to the integrated receiver decoder for acquiring samples of the digitized signal. In communication with the data capture module, a computer processes the digitized signal to obtain signal parameters, a broadcast system response and its inverse response. The system generates a display corresponding the signal parameters, broadcast system response and its inverse broadcast system response.

In a further aspect of the disclosure, a method of analyzing a broadcast system includes generating a baseband demodulated RF signal, digitizing the RF signal to form a digitized signal, acquiring samples of the digitized signal, and processing the digitized signal samples to obtain signal parameters, a broadcast system response and an inverse broadcast system response. The method may further include displaying the signal parameters, the broadcast system response and the inverse broadcast system response.

In a further aspect of the invention, a method of configuring analog equalizers for a transmission link includes forming a mathematical model of an analog equalizer having a plurality of mathematical model filter stages, determining a desired response, tuning each of the plurality of mathematical model filter stages toward the desired response to form a plurality of tuned filter parameters to compensate for distortions in the transmission link, coupling an analog equalizer having a plurality of filter stages to an RF chain, configuring the analog equalizer in response to the plurality of tuned filter parameters for its application in the broadcasting of RF signals.

One advantage of the disclosure is that an equalizer can be used to correct for distortions easily and, therefore, the quality of the system and customer satisfaction will increase.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
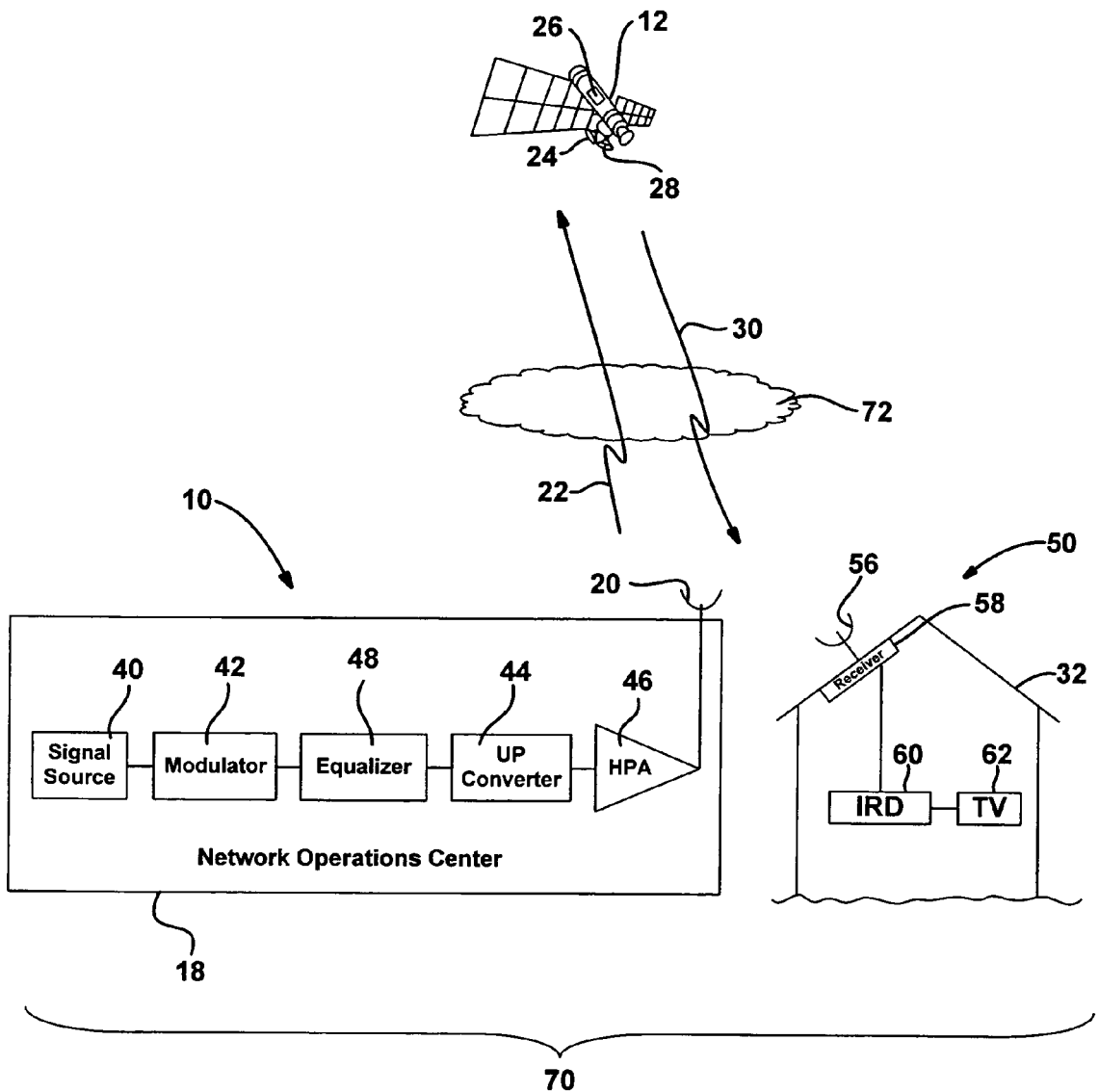
FIG. 1 is a system view of satellite transmission system formed according to the present disclosure.

The following description is merely exemplary in nature and is not intended to limit the present disclosure, application, or uses. It should be understood that throughout the drawings, corresponding reference numerals indicate like or corresponding parts and features. The present disclosure is described with respect to a satellite television system. However, the present disclosure may be used for various uses, including satellite transmission and data transmission and reception for home or business uses.

Referring now to FIG. 1, a satellite system 10 formed according to the present disclosure includes satellite 12 that receives uplink signals from a network operations center 18. Although only one satellite 12 is illustrated, various numbers of satellites may be included in the system. The network operations center 18 includes a transmitting antenna 20 that may be implemented as a plurality of transmitting antennas. The transmitting antenna 20 transmits uplink signals 22 to a receiving antenna 24 on satellite 12. Satellite 12 includes a transponder 26. Uplink signals 22 received by the satellite 12 through receiving antenna 24 are broadcast to various users through a transmitting antenna 28 and a downlink signal 30. The various users may include a user within a building 32.

Network operations center 18 includes a signal source or plurality of signal sources 40 that generate a signal. A modulator 42 is used to modulate the signal and an up-converter 44 is used to change the frequency of the modulated signal from the modulator 42. A high-power amplifier 46 receives the high-frequency signal from the up-converter 44. The signal from the high-power amplifier 46 is typically provided directly to a transmitting antenna 20. The present disclosure also provides an analog equalizer 48 used to equalize distortions in the signal prior to reaching the transmitting antenna 20.

Building 32 may include a receiving antenna 56 whose signal is provided to a receiver 58. The receiver 58 may include various components, including a low-noise block. The receiver 58 provides the signal to an integrated receiver decoder (IRD) 60, which processes the signal and provides it to a TV or other type of monitor 62. It should be noted that the radio frequency (RF) chain may include the various boxes set forth in FIG. 1, including the modulator 42, the up-converter 44, the high-power amplifier 46, the transmitting antenna 20, the receiving antenna 24, the transponder 26, the transmitting antenna 28, the receiving antenna 56, the receiver 58, and the integrated receiver decoder 60. Atmosphere interference represented by 72 may also distort the uplink signals 22 and/or the downlink signal 30. Therefore, distortion caused by atmospheric conditions is included in the RF chain 70.

Figure 2:
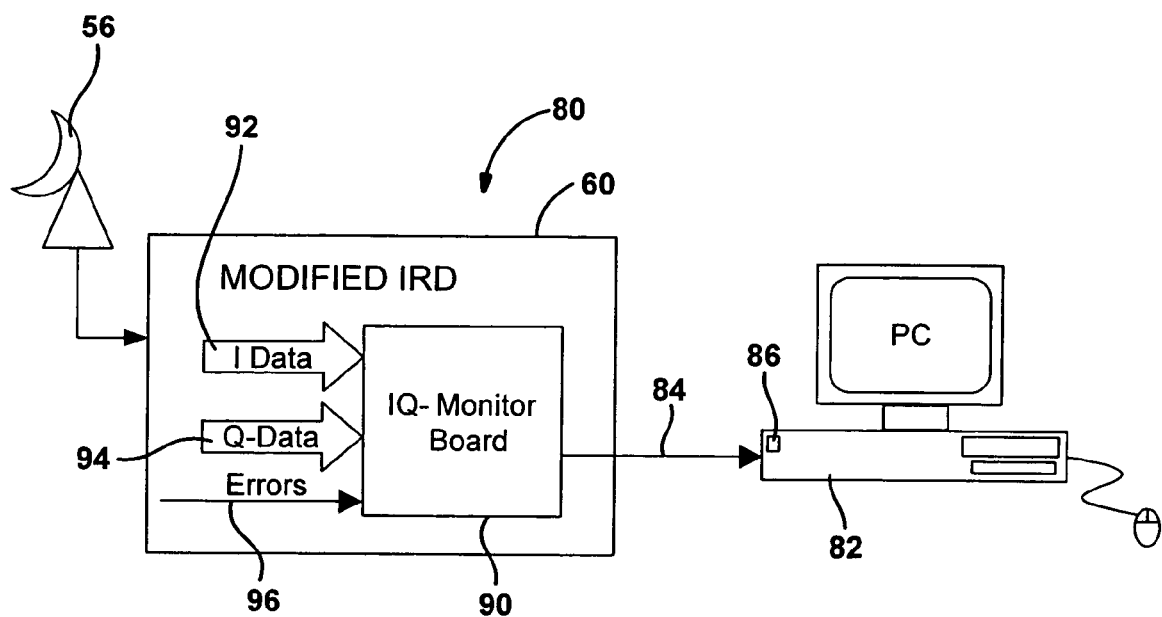
FIG. 2 is a block diagrammatic view of a signal monitoring system according to the present disclosure.

Referring now to FIG. 2, a signal monitoring and optimization system 80 is set forth. Receiving antenna 56 is coupled to the IRD 60 that has been modified. The IRD 60 is coupled to a computer 82 through a communication link 84. The computer 82 may be various types of computers that are used to run various types of software to perform various numerical calculations, as will be further described below. The computer 82 may include a serial port 86 to which the communication link 84 is coupled. Communication link 84 may be various types of communication links, including an RS-232 connection. Of course, those skilled in the art will recognize various types of connections may be used, including a USB connection, a parallel connection or the like.

As is generally shown, the modified IRD 60 includes an IQ monitor board 90, which receives in-phase data (I-data) 92 and quadrature data (Q-data) 94 from the circuitry of the IRD 60. Forward error correction information 96 may also be coupled to the IQ monitor board 90. The IQ monitor board 90 is used to acquire I-data 92, Q-data 94 and various errors 96, and couple them through the communication link 84 to the computer 82.

Computer 82 may perform various methods, described below, for acquisition, acquisition control, analysis, and display of the acquired in-phase and quadrature data from the integrated receiver decoder for estimating the broadcast system response and inverse response, and a program for tuning of a group delay equalizers.

Figure 3:
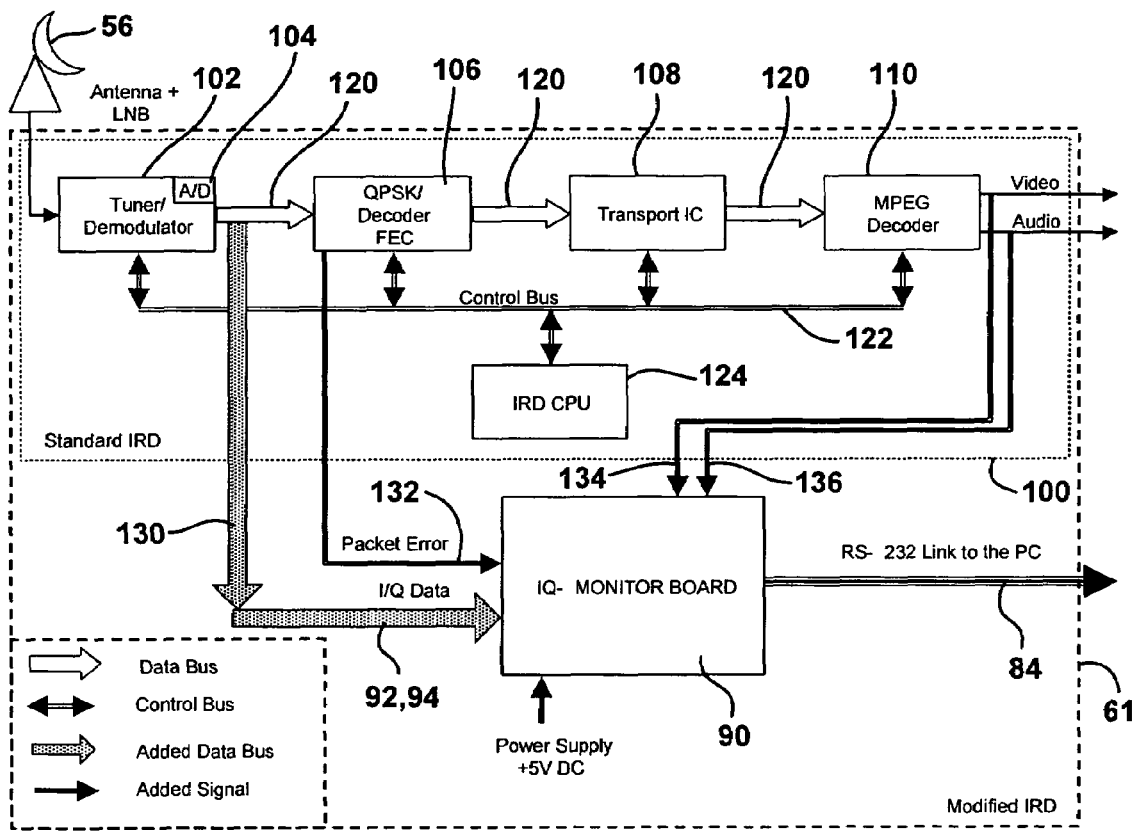
FIG. 3 is a block diagrammatic view of the modified integrated receiver decoder (IRD) of FIG. 2.

Referring now to FIG. 3, the IRD 60 includes a standard IRD 100 and the IQ monitor board or module 90. The standard IRD 100 includes a tuner and demodulator 102 that receives the RF signal from the antenna 56. The tuner and demodulator 102 generates a baseband demodulated RF signal. The tuner and demodulator 102 may also include therein, or as a separate component, an analog-to-digital converter 104. The analog-to-digital converter 104 digitizes the demodulated RF signal. A decoder 106 may include quadrature phase shift keying (QPSK) and forward error correction (FEC). The decoded signals provided to a transport integrated circuit (IC) 108, which, in turn, is provided to an MPEG decoder 110. The tuner and demodulator 102, the decoder 106, the transport IC 108, and the MPEG decoder 110 may be coupled together through a data bus 120. A control bus 122 may also couple the tuner and demodulator 102, the decoder 106, the transport IC 108, and the MPEG decoder 110. The control bus 122 may be coupled to an IRD central processing unit (CPU) 124. The IRD CPU 124 controls the processing of the system.

An additional data bus 130 may be coupled within the standard IRD 100 so that I-data 92 and Q-data 94, and the signals associated with them, may be coupled to the IQ monitor board 90. The decoder 106, as mentioned above, may include forward error correction. The forward error correction may be Reed-Solomon forward error correction. Counts of uncorrected packets may be provided to the IQ monitor board 90 from the decoder 106 as a packet error signal 132. A video signal output 134 from the MPEG decoder 110 and an audio signal output 136 from the MPEG decoder 110 may also be provided as an input to the IQ monitor board 90.

Figure 4:
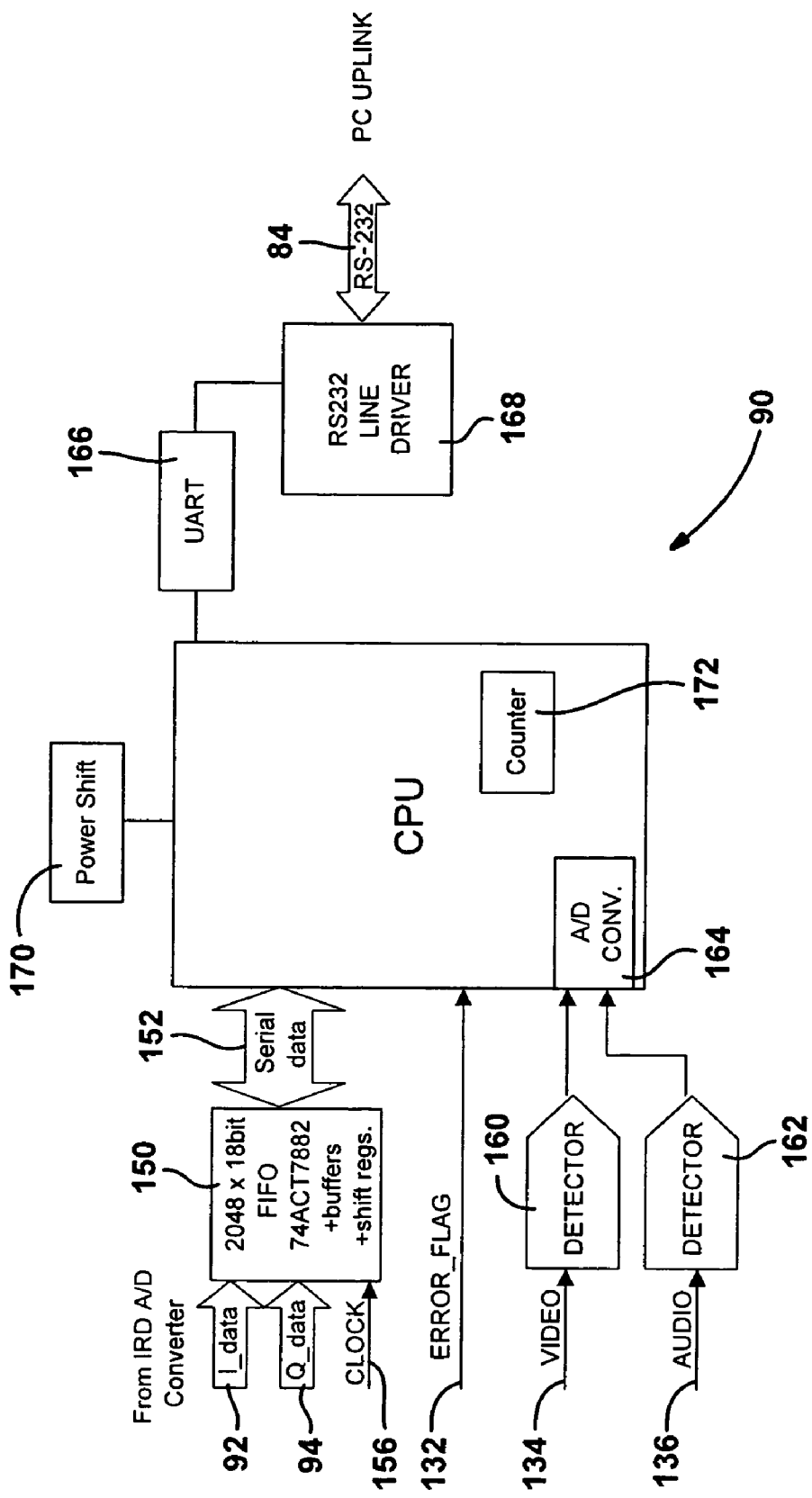
FIG. 4 is a block diagrammatic view of the in-phase and quadrature (IQ) monitor board of FIG. 3.

Referring now to FIG. 4, the IQ monitor board 90 is illustrated in further detail. The I-data 92 and the Q-data 94 are provided to a first-in-first-out (FIFO) module 150. The FIFO module 150 may act as a buffer and a shift register for the data received. The data may be serially-coupled over a serial data communication line 152 to a CPU 154. FIFO module 150 may also include a clock input 156 used to control the operation of the shifting function. The CPU 154 is also coupled to detectors 160, 162, which receive the video signal output 134 and audio signal output 136, respectively. The detectors 160, 162 provide analog signals, which are converted to digital signals through an analog-to-digital converter 164, which may be included as part of the CPU 154. The CPU 154 processes the signals and couples them through a universal asynchronous receiver transmitter (UART) 166. The UART 166 provides signals to a line driver 168, which, in turn, is coupled to the communication link, such as an RS-232 connection.

CPU 154 may be various types of processors, including a free-scale MC68HC908GP32 processor that operates at a 8 MHz. Those skilled in the art will recognize that various types of processors may be used. The CPU 154 receives data, such as six bits of in-phase data and six bits of quadrature data, as well as an acquisition clock input 156. The register length may be 2048 I- and Q-data samples per packet. As mentioned above, the packet error signal 132 may also be provided to a digital input to the CPU 154. A power supply 170, such as the power supply of the integrated receiver decoder, may be used to power the CPU 154. The CPU 154 acquires or gathers the digitized I- and Q-data samples from the A-to-D converter of the IRD. The CPU 154 also polls the IRD packet error signal and detects the presence of the analog audio and video signals at the output of the IRD.

The CPU 154 performs various functions, including receiving and interpreting computer commands. When the computer 82 requests an acquisition of 2048 samples of the I- and Q-data signal, the CPU 154 acquires the data and transfers it to the computer 82 by way of the UART 166. A counter 172 within the CPU 154 may be used to count the packet error signal errors. CPU 154 also determines the analog levels of video signal output 134 and audio signal output 136 to determine their existence.

The computer 82 of FIG. 2 is used to control the operation of the IQ monitor board 90. As will be described below, control software is used for various purposes, including generating a constellation diagram, calculating associated parameters and evaluating the power spectrum from data. The data may also be logged.

Figure 5:
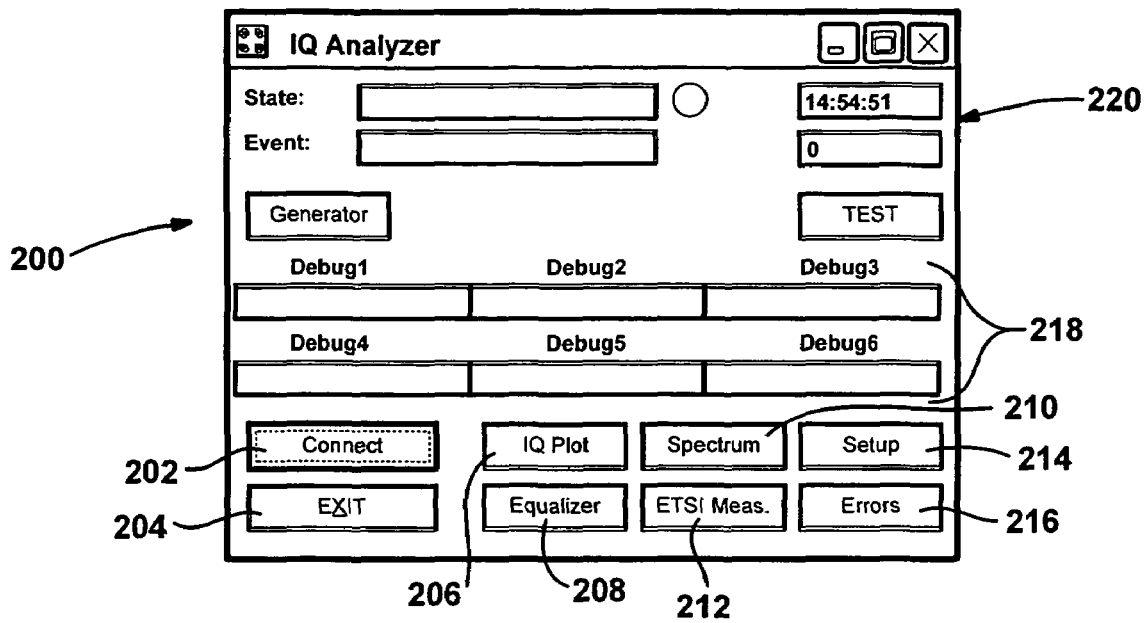
FIG. 5 is a screen view of a user interface for an IQ analyzer command window.

Referring now to FIG. 5, a control window 200 is illustrated having various selectable boxes, such as a connect box 202 and exit box 204, an IQ plot box 206, an equalizer box 208, a spectrum box 210, a European Telecommunications Standards Institute (ETSI) measurement box 212, a set-up box 214, and an errors box 216. The ETSI measurement box 212 performs a measurement according to the ETSI digital video broadcasting (DVB) standard TR 101-290. Start-up is initiated using the set-up box 214. Debug boxes 218 may also be provided for debugging the system. Identifier boxes 220 may also be provided to identify the name of the test or the like.

Figure 6:
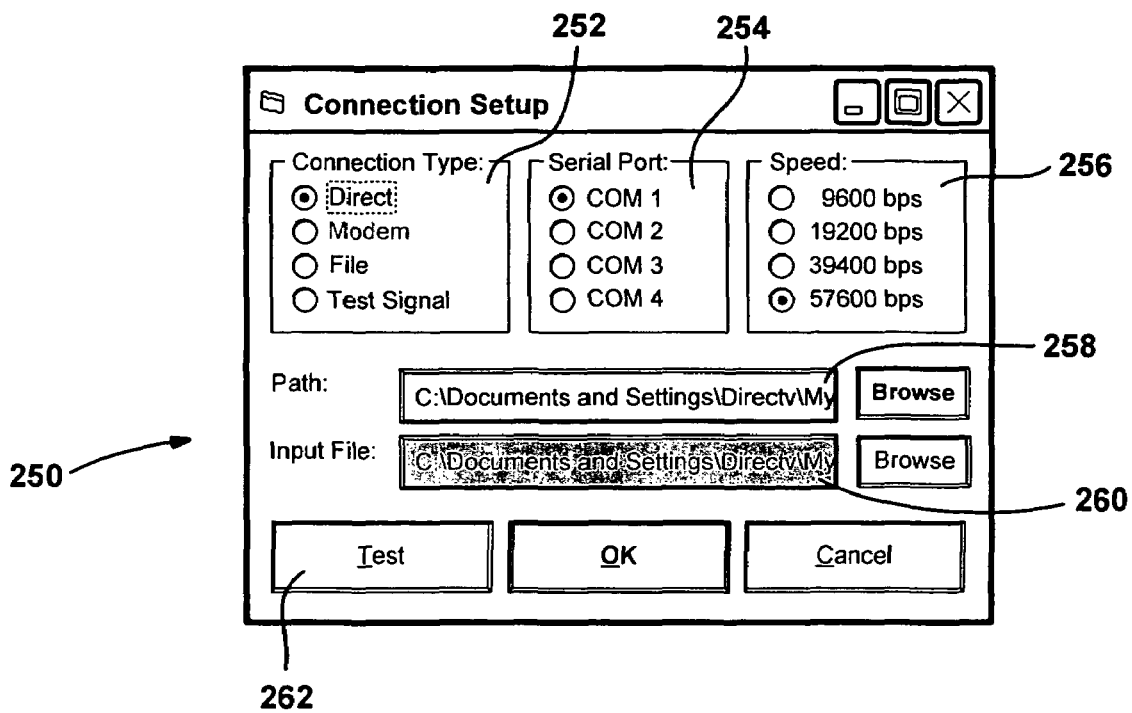
FIG. 6 is a screen view of a user interface for a connection set-up window.

Referring now to FIG. 6, when set-up box 214 is selected, window 250 is displayed, in which a connection type may be selected at connection box 252, a serial port type may be selected at serial port box 254, and a speed type may be selected at speed box 256. Also, a path for the data may be input into box 258. Should a follow-the-input rather than a direct connection be used, an input file box 260 may also be selected. The input file box 260 is deselected in this example since a direct connection has been selected. The direct connection is used for the direct acquisition of data from the IRD by way of the RS-232 communication link described above. The serial port box 254 selects the serial port through which the IRD is connected on the particular computer. Preferably, speed box 256 is used to select the highest speed for a reliable connection.

By selecting test button 262, a diagnostic procedure may be run to check the integrity of the communication link with the IRD.

Figure 7:
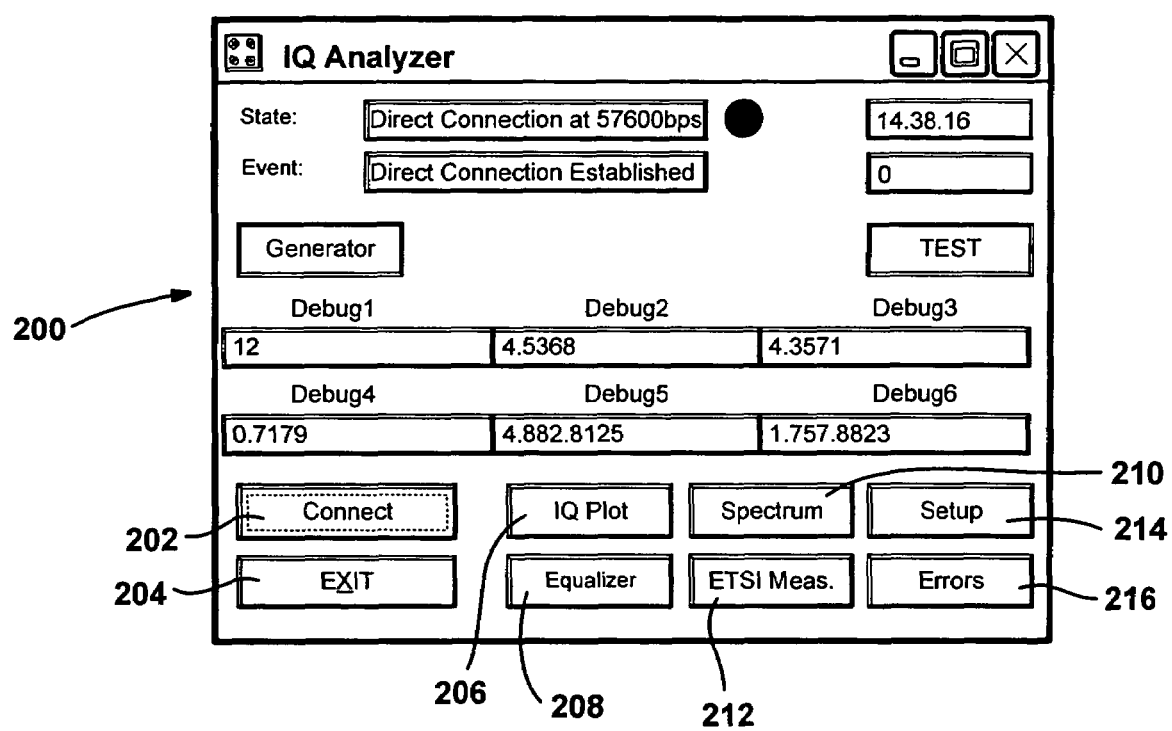
FIG. 7 is screen view of a command window with direct connection to an IRD.

Referring now to FIG. 7, window 200, described above in FIG. 5, is illustrated after a connection has been established. Notice, the wording in connect box 202 has changed to "connect."

By selecting the IQ plot box 206, an IQ constellation may be displayed.

Figure 8:
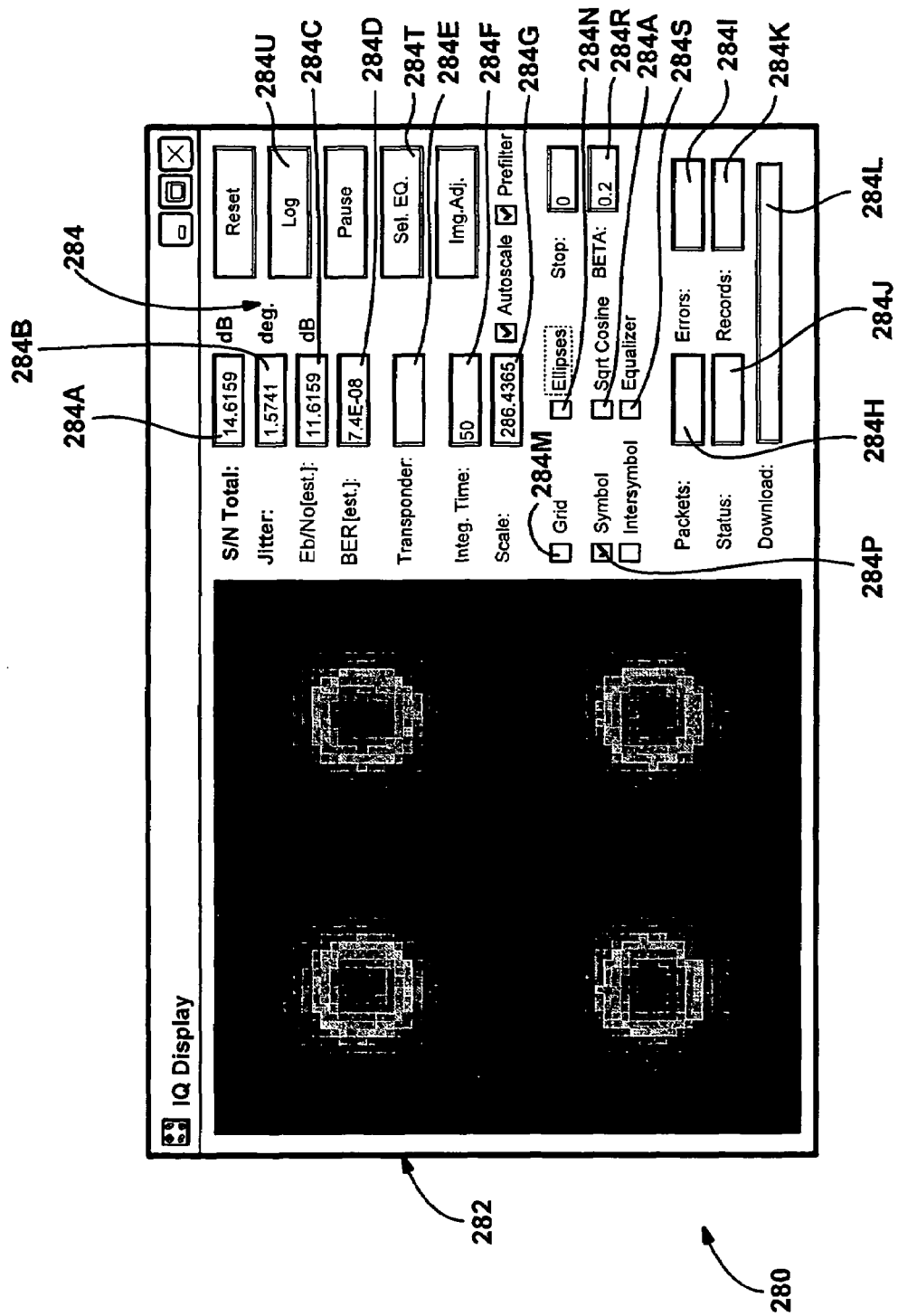
FIG. 8 is a screen view of a plot illustrating a IQ constellation diagram and various parameters.

Referring now to FIG. 8, a window 280, including an IQ display 282 and parameters 284, is illustrated. The window 280 and the IQ display 282 show a histogram of modulation factors computed from the data acquired from the IRD. This may be referred to as a modulation diagram. This may be performed from previously-recorded data or data generated from a synthetic signal generator for testing purposes. Each pixel in the diagram may be color-coded according to its repetition rate. More frequent points may be colored from dark to light red, less frequent points from green to yellow to blue. The data illustrates four circles that represent an ideal display. An "ideal display" is one that is nearly symmetrical. Each of the circles in the display represent one quadrant of the I and Q axis system. As described below, bigger, less uniform circles indicate more distortion in the RF signal chain. As illustrated in window 280, the parameters 284 may include various parameters, such as a signal-to-noise total shown in box 284A. The signal-to-noise total is omni-directional and provides a ratio that is approximately equal to the modulation error ratio of figure specified by the ETSI TR 101-290 standard. It may be expressed in decibels. The signal-to-noise ratio total is an indicator of signal quality.

Another parameter displayed on the display window 280 is jitter in box 284B. The "jitter" is the root-mean-square angular dispersion of signal vectors. Jitter is an indicator of signal distortion as expressed in degree RMS. It is computed by subtracting the noise from the total RMS jitter plus noise figure specified in the above standard.

An energy-per-bit noise power spectral density ratio (Eb/No) box 284C is an estimation of the Eb/No from the signal-to-noise ratio, assuming a signal with average white Gaussian noise only and no phase distortion. This parameter defines the signal-to-noise ratio per bit.

A bit error rate (BER) signal box 284D parameter may also be estimated from the signal-to-noise ratio and the normal Gaussian distribution function. Other status indicators are provided in window 280 and include a transponder indicator box 284E that provides a numeric indicator of the tuned transponder, an integration time box 284F, a scale indicator box 284G that has the repetition scale range, a packet indicator box 284H that indicates the number of received IQ packets, an error indicator box 284I that indicates the number of downloaded and/or decoded errors, an RS-232 status indicator box 284J that indicates the status between the IRD and the computer, a records status box 284K that has a number of records stored so far in the current log, and a download transfer progress indicator box 284L.

The integration time box 284F displays the number of data windows or packets that are exponentially averaged to form the display. A grid control box 284M displays a combined polar-rectangular grid. An ellipse control generated from reference box 284N generates an ellipse on the display. The ellipse encloses the most probable shape of the cloud, which is a set of the most frequent points from the I- and Q-data signals. The ellipse is proportional to the signal-to-noise in the radial direction and to the jitter in the azimuthal direction. A symbol box 284P may be used to display the samples at the symbol or the inter-symbol timings. Another control is called "SQRT cosine," which is denoted by box 284Q and is used to process the data through a square-root-raised cosine filter to emulate the processing done at the IRD demodulator. The beta box 284R is the excess bandwidth of the square-root-raised cosine filter. The range is from 0.0-1.0. The default value is 0.2, which indicates a 20% excess bandwidth. The equalizer box 284S allows the data to be processed through a finite impulse response equalizer. The desired equalizer is loaded using the SEL EQ button 284T.

A log button 284U may be used to activate a data log window, as will be described with FIG. 11 below.

Figure 9:
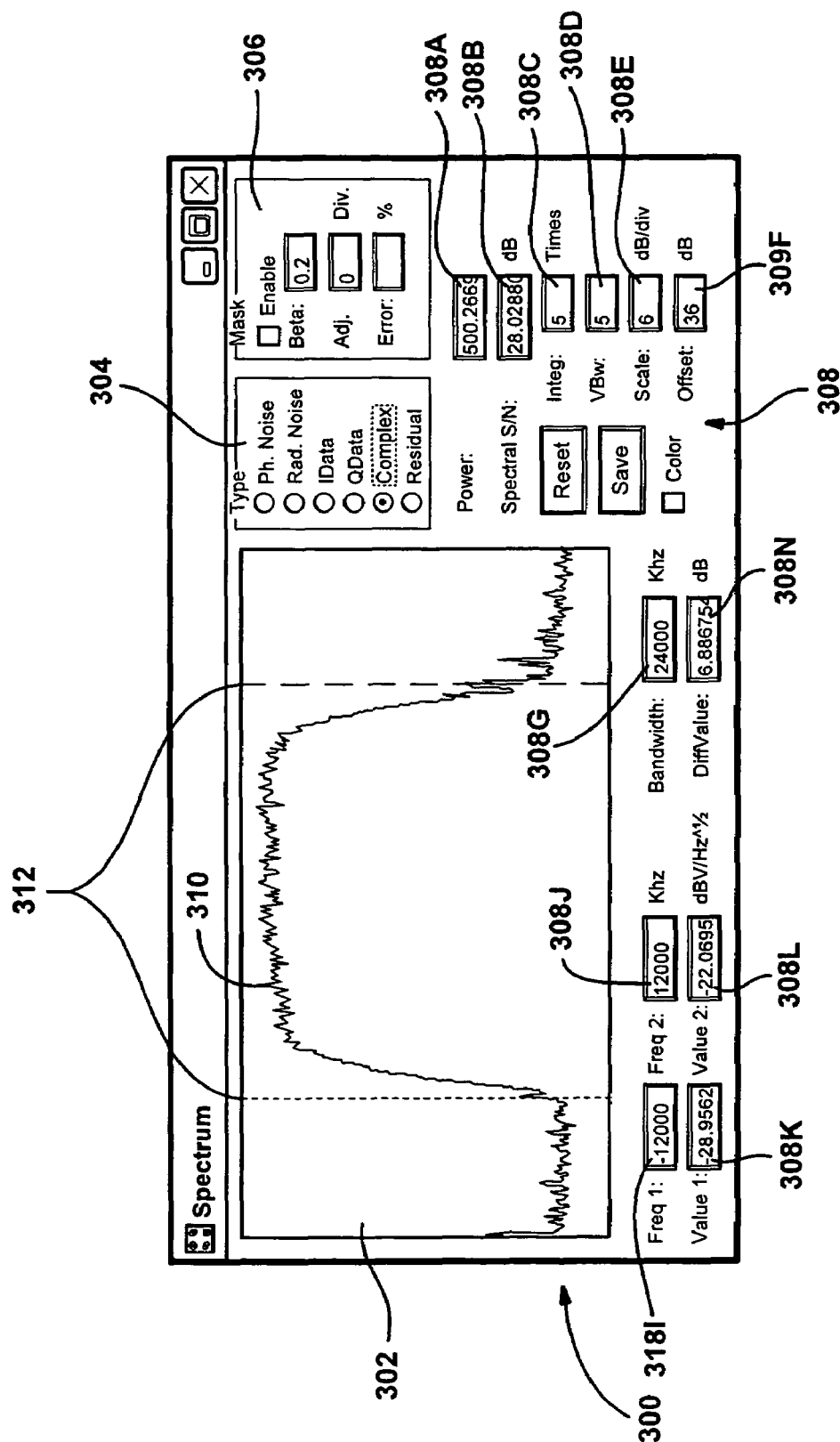
FIG. 9 is a screen view of a power spectrum analysis window.

Referring now to FIG. 9, a screen display having power spectrum analysis window 302 initiated from the spectrum box 210 of FIG. 5 or 7 is illustrated. Various controls within the window 300 are set forth, which include a display type box 304, a mask type box 306 and various parameters 308, including power box 308A, spectral signal-to-noise ratio box 308B, integration time box 308C, view box 308D, scale box 308E, offset box 308F, bandwidth box 308G, differential value box 308H, various frequencies in boxes 308I, 380J and various display values 308K, 380L.

FIG. 9 illustrates a power spectrum analysis window that includes a complex spectrum display 310. The complex spectrum display 310 includes lines 312 that define the bandwidth of the system. It should be noted that there are several types of analysis that may be performed using the window 300 of FIG. 9, which include complex band spectra, complex residual spectra, and I and Q complex baseband spectra. A square-root-raised cosine filter may be superimposed to form spectra types as a reference shape. From a center line, the frequency span may be 40 MHz, with divisions every 10 MHz. The vertical axis may be in decibels. This complex spectrum display 310 is generated from the amplitude of a fast Fourier transform of the complex signal $z=I+jQ$.

Figure 10:
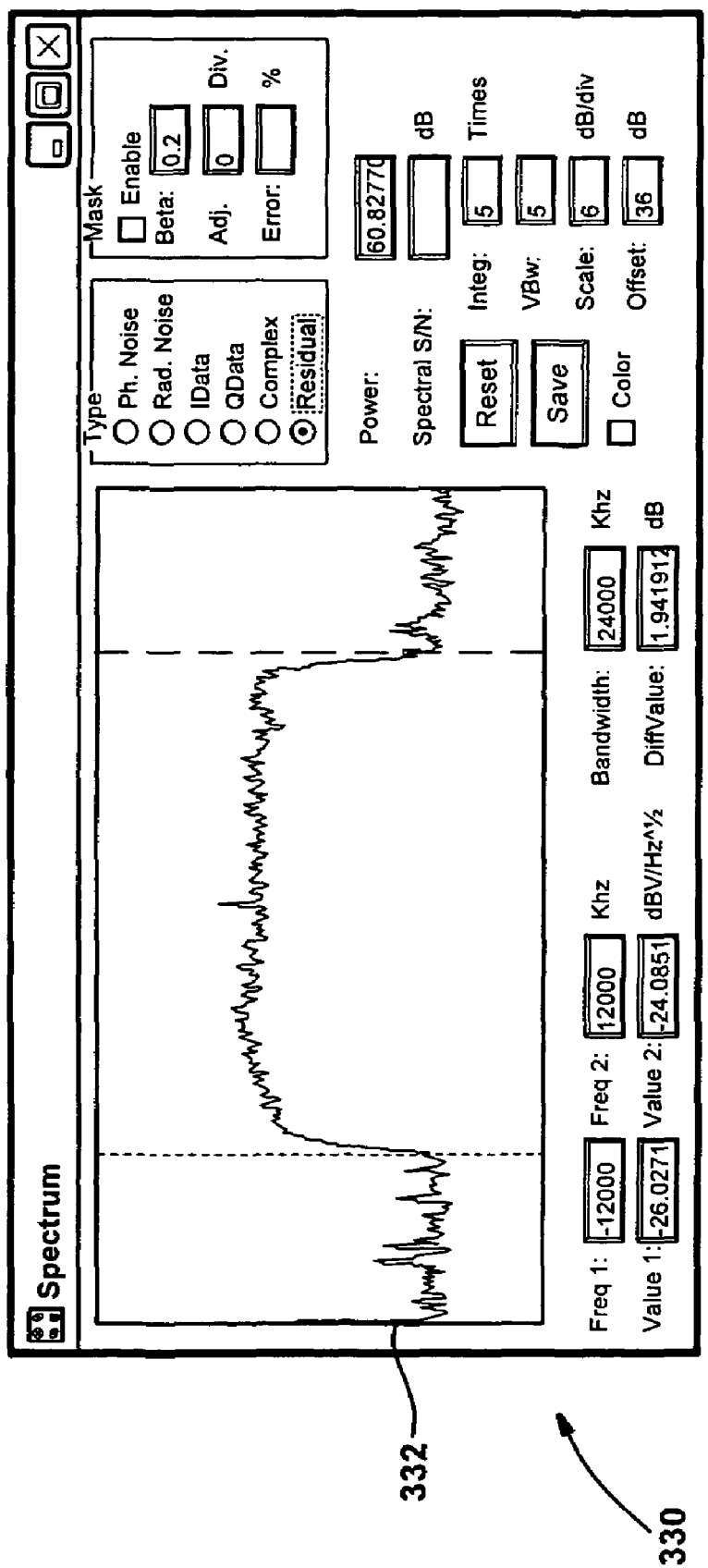
FIG. 10 is a screen view of a residual spectrum and associated display.

Referring now to FIG. 10, a window 330 similar to that illustrated in FIG. 9, except with a residual spectrum display 332, is illustrated. When the input signal is tentatively demodulated, and the recover data symbols are shaped and modulated back again, an approximation to the transmitted signal may be performed or constructed. If the signal is time-aligned and subtracted from the input signal, a residual signal is obtained. The residual spectrum display 332 illustrates the amplitude spectrum of the complex residual signal.

The windows described in 300 and 330 may also be used to display I- and Q-data spectrum of the channel I and Q, which may be processed and displayed separately. The above windows 300, 330 may also be with a square-root-raised cosine spectrum mask that may be superimposed to some spectra types and a matching error may then be computed. The mask corresponds to the theoretical shape of the data after being processed by the square-root-raised cosine filter in the IRD. The error box shows a matching error index between the display spectrum and the ideal shape represented by the mass.

Figure 11:
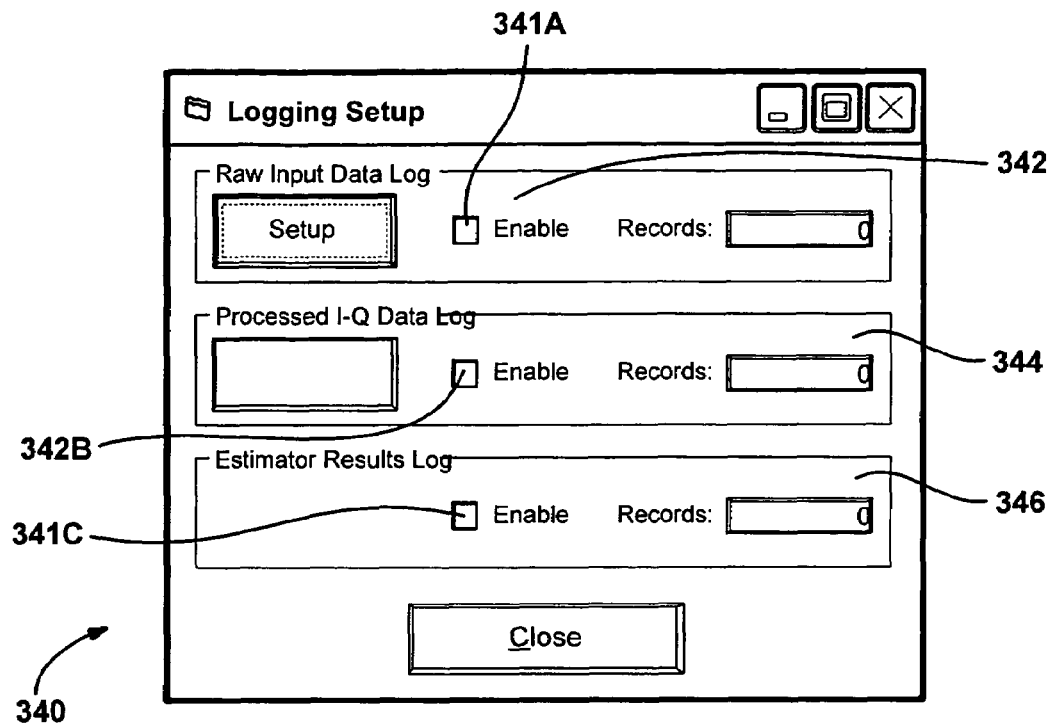
FIG. 11 is a screen view of a logging set-up window according to the present disclosure.

Referring now to FIG. 11, it should be noted that various data logging capabilities may be performed. From the I- and Q-data display window, there are various output streams that may be logged, which include the raw input data, the processed IQ data and the estimated results. The log button 284U illustrated in FIG. 8 opens up the window 340 illustrated in FIG. 11. By selecting one of the enable boxes 341A, 341B, 341C, the particular enabled box associated with a particular type of data is logged. Once the programmed number of records are stored, the log stops automatically and the file may be closed and the logged disabled. Section 342 is used to log the raw input data and stores the IQ packets as they come from the IRD without any further processing, in a format to be reviewed later. Section 344 is a processed IQ data log, which is used to store data for later post-processing, typically for the use of broadcast response for a broadcast response estimation tool. The data is gathered after being corrected for carrier frequency and phase shift residuals and, if selected, after being filtered and/or equalized. The estimator results log section 346 stores the results of different of different parameter estimators in ASCII text file, which may be Excel- or other spreadsheet-compatible.

Figure 12:
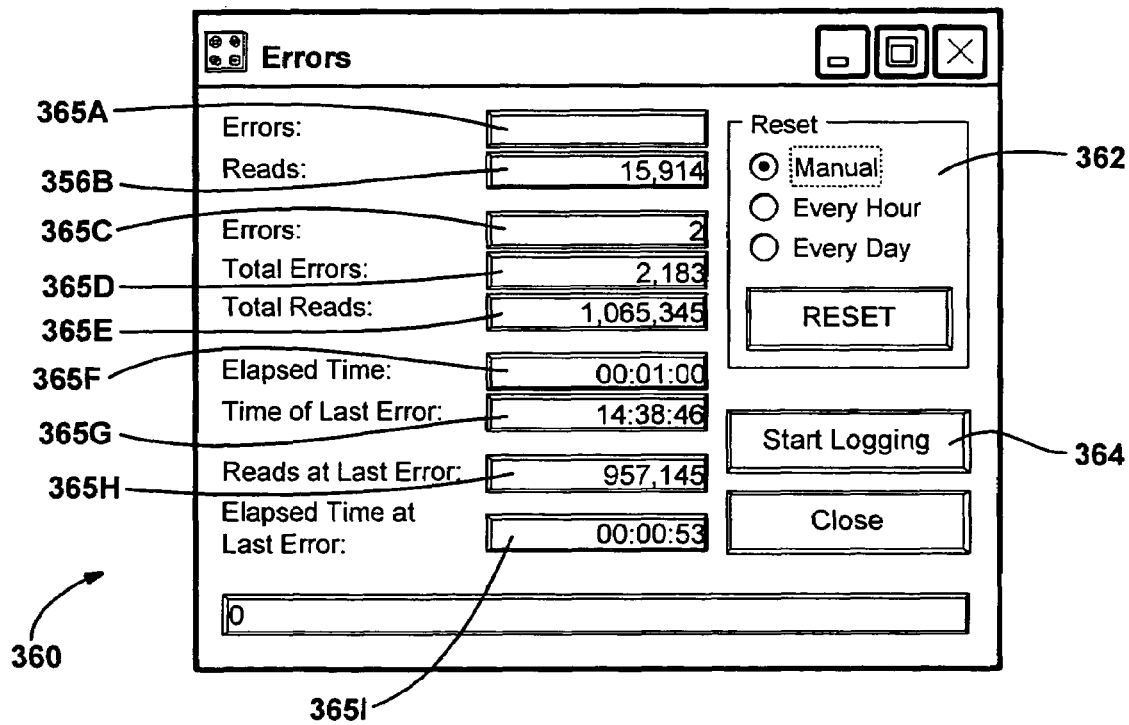
FIG. 12 is a screen view of a packet error counter window according to the present disclosure.

Referring now to FIG. 12, when the errors box 216 of FIG. 7 is selected, window 360 is displayed. When the IRD receives a data packet that the Reed-Solomon decoder cannot fully correct, it signals the event by means of a packet error flag. Errors that the Reed-Solomon decoder cannot decode are errors in more than 8 bytes. The IQ monitor board 90 described above is able to read the flag and count the events, and transfer the count to the computer with every IQ data packet sent. Various parameters are displayed in window 360, including the number of error packet events detected in errors box 365A. The number of times the flag was read is included in the reads box 365B. The number of IQ data packets received with at least one error is referred to as "the burst," which is displayed in burst box 365C. The "total errors" is the total number of errors since the last reset. This is also displayed in window 360 at box 365D. The "total reads" is the total number of readings, which is displayed in window 360 at box 365E. An elapsed time since the last reset is also displayed at box 365F. The last time of error according to the local computer time may also be displayed at box 365G. Window 360 may also include a reads at last error box 365H, which is the number of readings performed from the last reset up to the detection of the last error, and an elapsed time at last error box 365I, which displays the last time from the last reset up to the detection of the last error. A control box 362 is used for setting the reset period and the reset button. As illustrated, a "manual," "every hour" and "every day" setting is selectable. The reset period may be set between infinite (manual reset), every hour or every 24 hours. A start/stop button 364 may also be included. The start or stop of the logging of error packets is controlled by this button. The indicator may turn a different color when logging is on and red when logging is off, for example.

Figure 13:
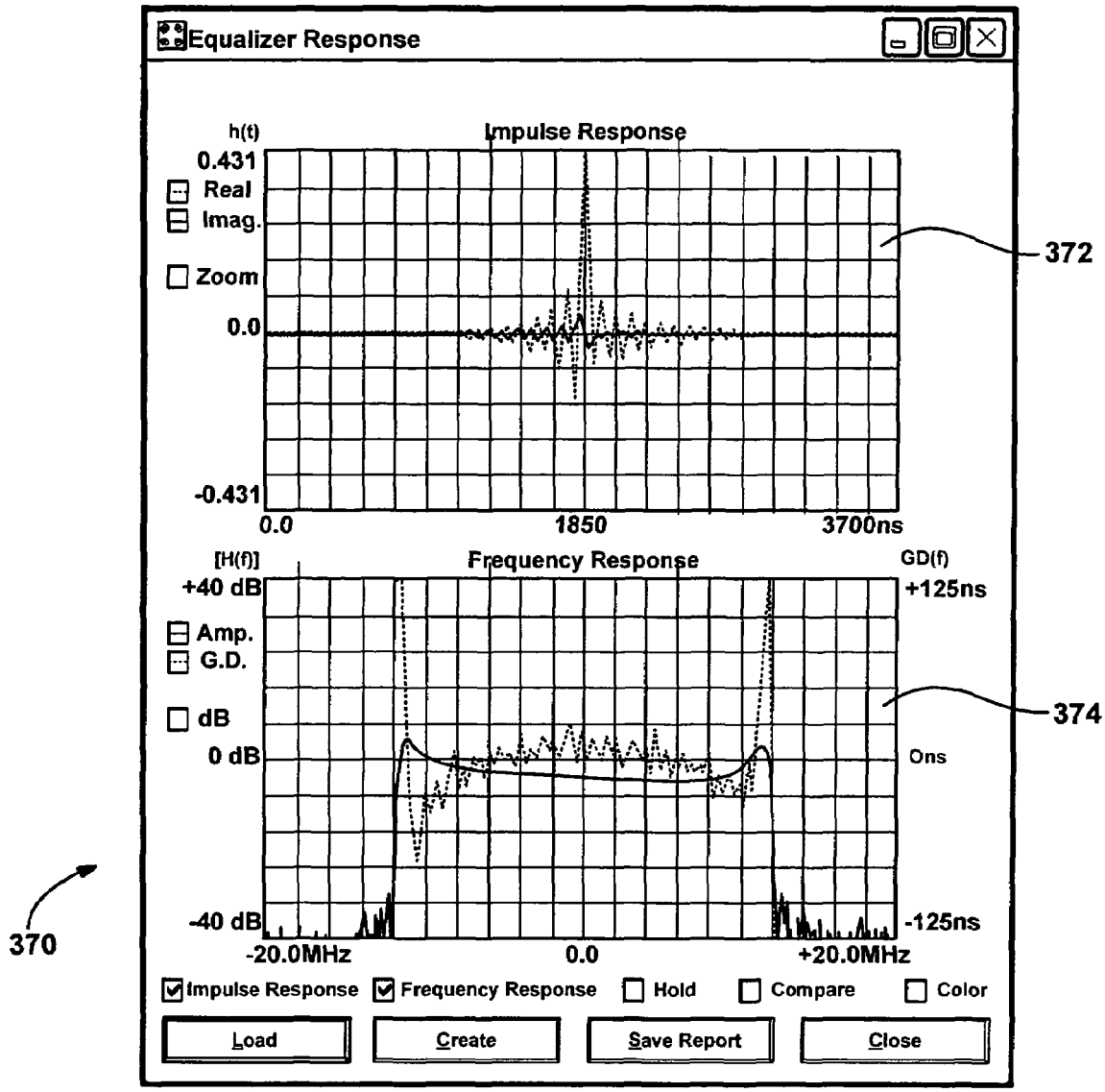
FIG. 13 is a screen view illustrating an equalizer response window

Referring now to FIG. 13, an equalizer response window 370 is illustrated. In the following window, an evaluation of the broadcast system response and its inverse are determined. Broadcast system response is evaluated statistically using a Wiener filter, to assess the overall distortion generated on the signals which is responsible for inter-symbol interference. The inverse of the response is called the "equalization filter," which is used to correct the distortion. The response and the inverse response may be displayed in various ways, either in the time domain (impulse response), or in the frequency domain (amplitude/group delay response). In window 370, plot 372 is an impulse response having both a real portion and an imaginary portion. The real portion and imaginary portion are plotted against time in nanoseconds. In plot 374, an amplitude and group delay in the frequency domain is plotted versus frequency. It should be also noted that this window is accessed by selecting the equalizer button 208 illustrated in FIGS. 5 and 7.

Figure 14A:
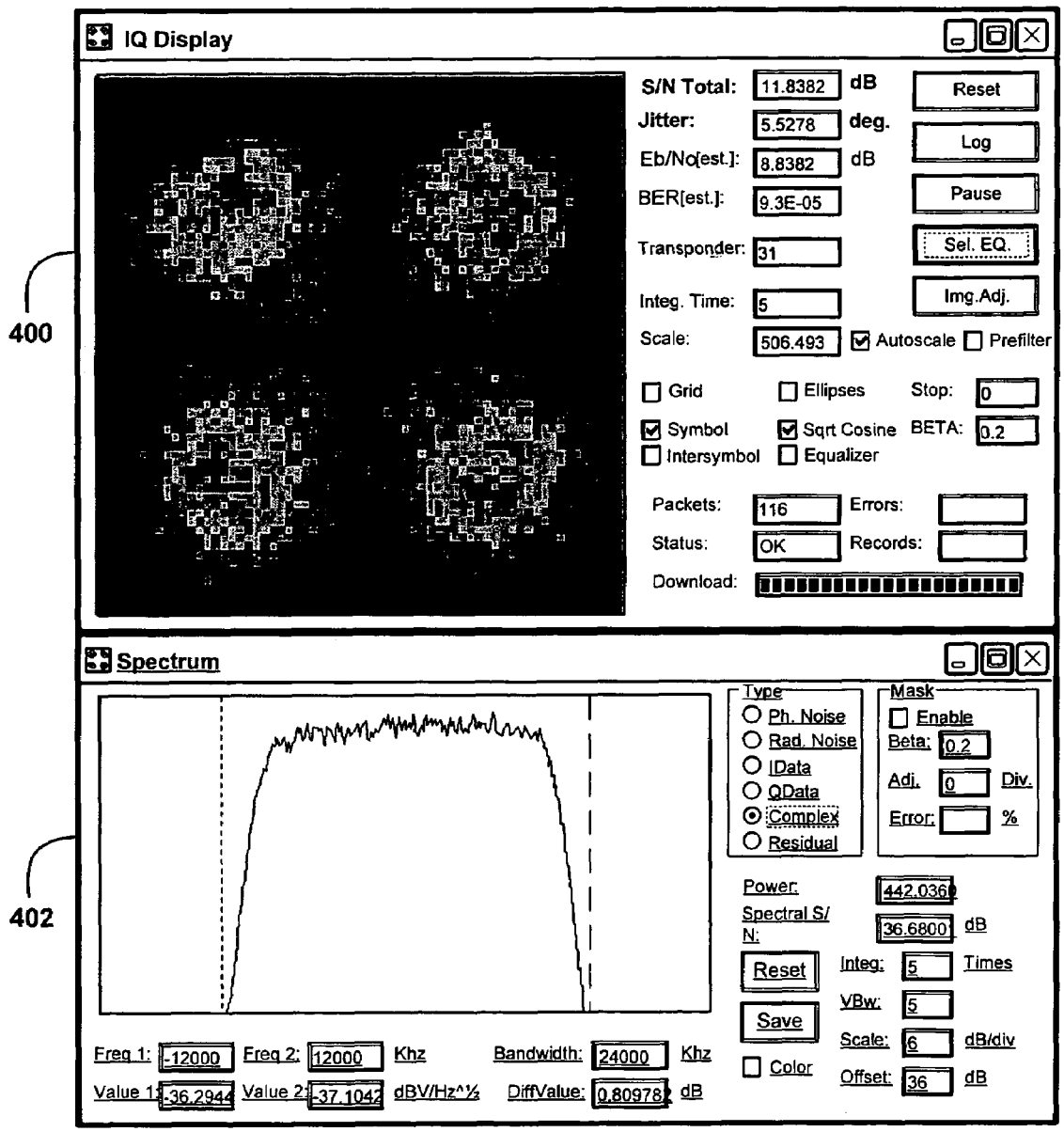
FIG. 14A is a screen view of a transponder signal before equalization.

Referring now to FIG. 14A, a window 400 similar to that of FIG. 8 and a window 402 similar to that of FIG. 10 is illustrated. Each of the windows 400, 402 includes the same parameters. The plots shown in windows 400 and 402 have data that has not yet filtered. As can be seen, the burst in window 400 are very scattered. The signal-to-noise total is 11.8382 dB and the jitter is 5.5278°.

Figure 14B:
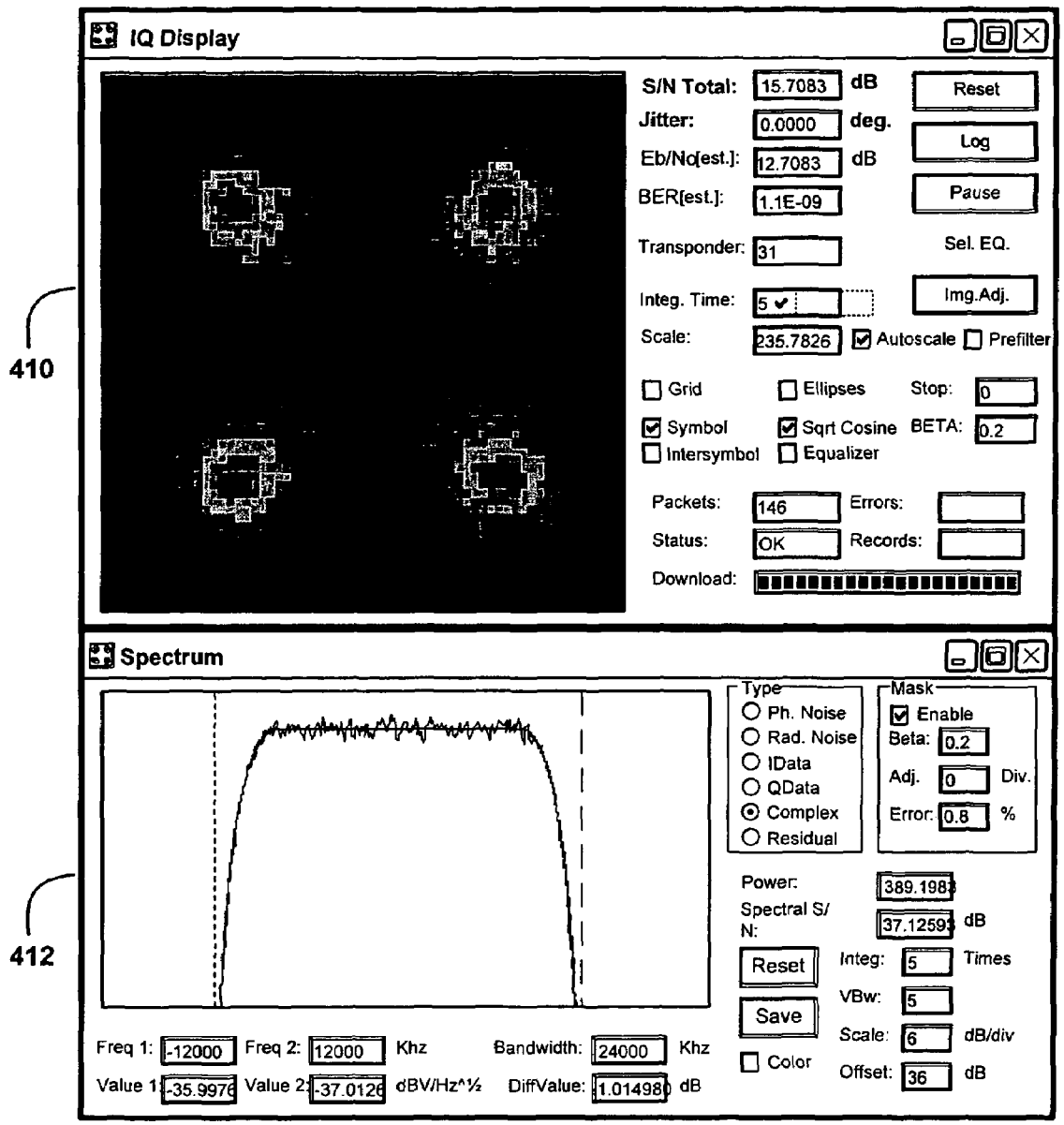
FIG. 14B is a screen view of a transponder signal with an equalization.

Referring now to FIG. 14B, an inverse response is applied to the data used for the plots in windows 400 and 402. As can be seen, the plots have a higher signal-to-noise total ratio at 15.7083 dB and a jitter of 0°. The four plots of windows 410 are much more compact and the spectrum window 412 is much flatter than plot 402. It should be noted that the tools described above can yield an equalizer response for the data, which, in turn, is a desired response for the system. Turning an equalizer to the desired response is described below.

Figure 15:
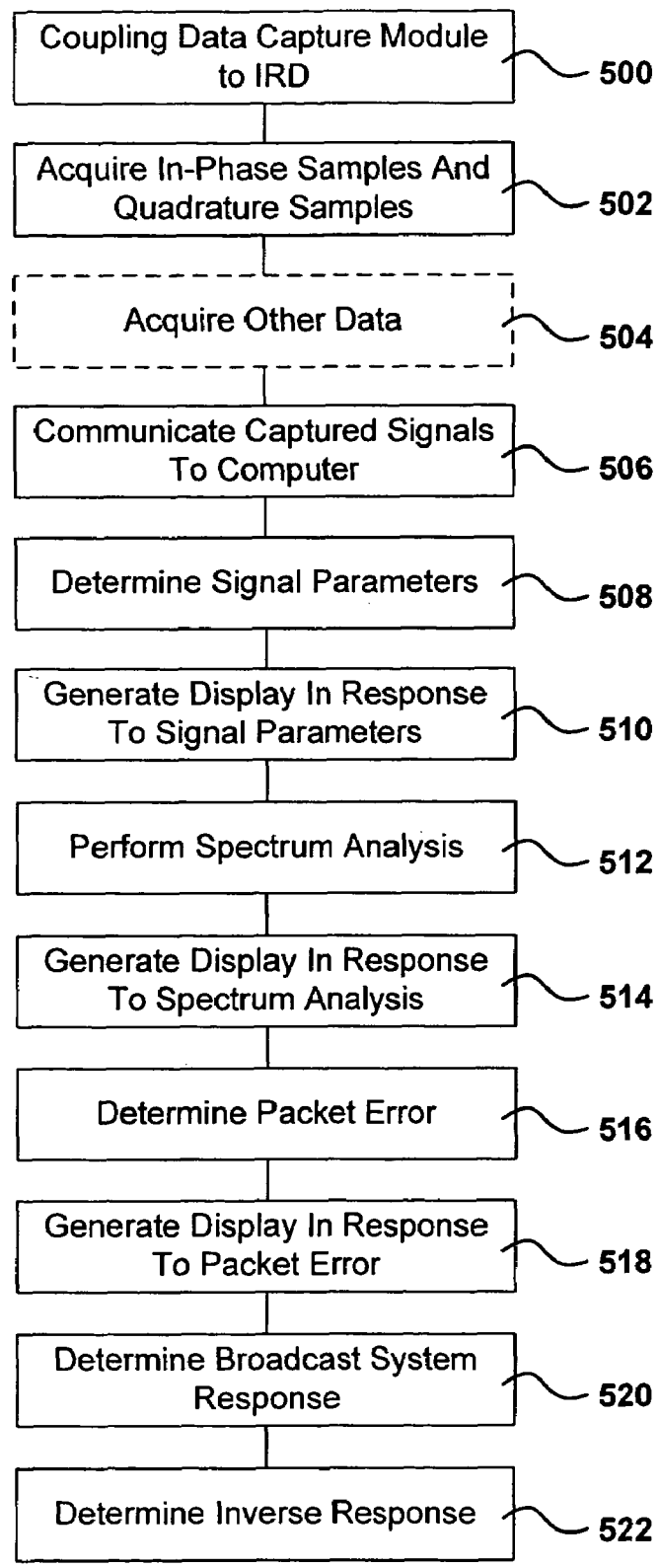
FIG. 15 is a block diagrammatic view of summary of a method for determining parameters, spectrum analysis and broadcast system responses.

Referring now to FIG. 15, in Step 500, the data capture module, such as the IQ module, is coupled to the integrated receiver decoder. It should be noted that the integrated receiver decoder may include an extra module upon manufacture, or may be couple later with the IQ module. In Step 502, in-phase samples and quadrature samples are acquired. These samples may be saved in the IQ monitor board 90 or received and passed through to the computer 82. In Step 504, other data may be acquired. The other data may include error data, such as packet error data, and audio and video signals.

In Step 506, the in-phase and quadrature sample signals are communicated to the computer 82. In Step 508, various signal parameters described above are calculated and obtained.

In Step 510, the displays are used to generate a display in response to the signal parameters.

In Step 512, a spectrum analysis may be performed. The spectrum analysis data results may be displayed on the computer 82. In Step 514, a display, such as a graph, may be generated in response to the spectrum analysis.

In Step 516, a packet error may be determined. As mentioned above, the packet error may be counted on the IQ monitor board 90. In Step 518, a display is generated in response to the packet error. That is, the numbers of the displays may be generated. In Step 520, a broadcast system response is determined. In Step 522, the inverse response, such as an equalizer filter, may also be determined.

Referring back to FIG. 1, an equalizer 48 may be coupled within the network operations center 18 at various locations in the transmission chain. The equalizer 48 may be an amplitude and group delay equalizer that uses a sequence of filters in cascade. Each one of the filters, in principle, provides a fraction of the total correction for a particular frequency range. As mentioned above, in the Background, tuning such filters by hand is exceedingly difficult, since each section has a significant overlap with the rest and the adjustment of each interferes with the others, requiring endless iterations. Also, as mentioned above, these iterations become seemingly endless and an optimized result is typically not obtained.

Figure 16:
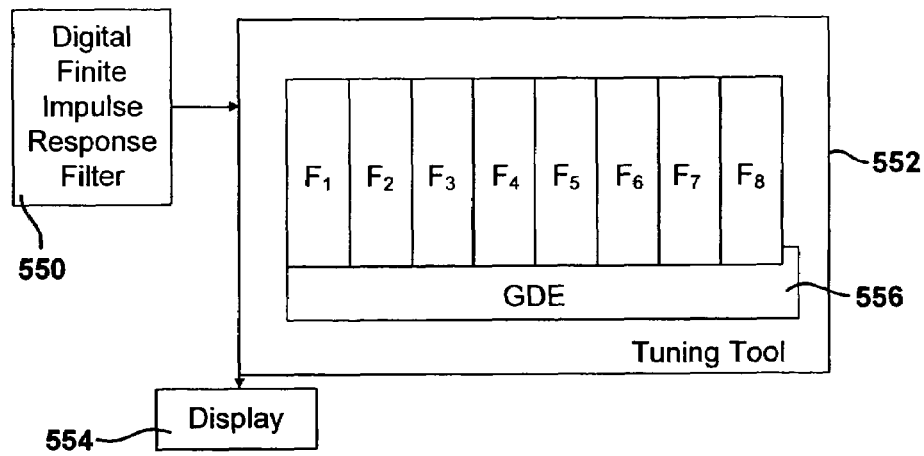
FIG. 16 is a block diagrammatic view of the digital finite impulse filter coupled to a tuning tool.

Referring now to FIG. 16, a tool is set forth to assist in process of a group delay equalizer. As will be set forth below, the tool estimates the required response iteratively and interactively matching a mathematical model of the equalizer circuit with the desired response and computing the circuit parameters. The matching is obtained using a non-linear release squares method. The digital finite impulse response generated as the inverse response from Step 522 is illustrated in filter box 550. The equalizer tuning tool 552 receives the output of the digital finite impulse response filter. The output of the tuning tool 552, which resides on the computer 82 described above, is shown in display 554. The tuning tool 552 uses a mathematical model of each of the filters for the least square fit, as described below. In this embodiment, only eight filter stage outputs are illustrated, as F1-F8.

Figure 17:
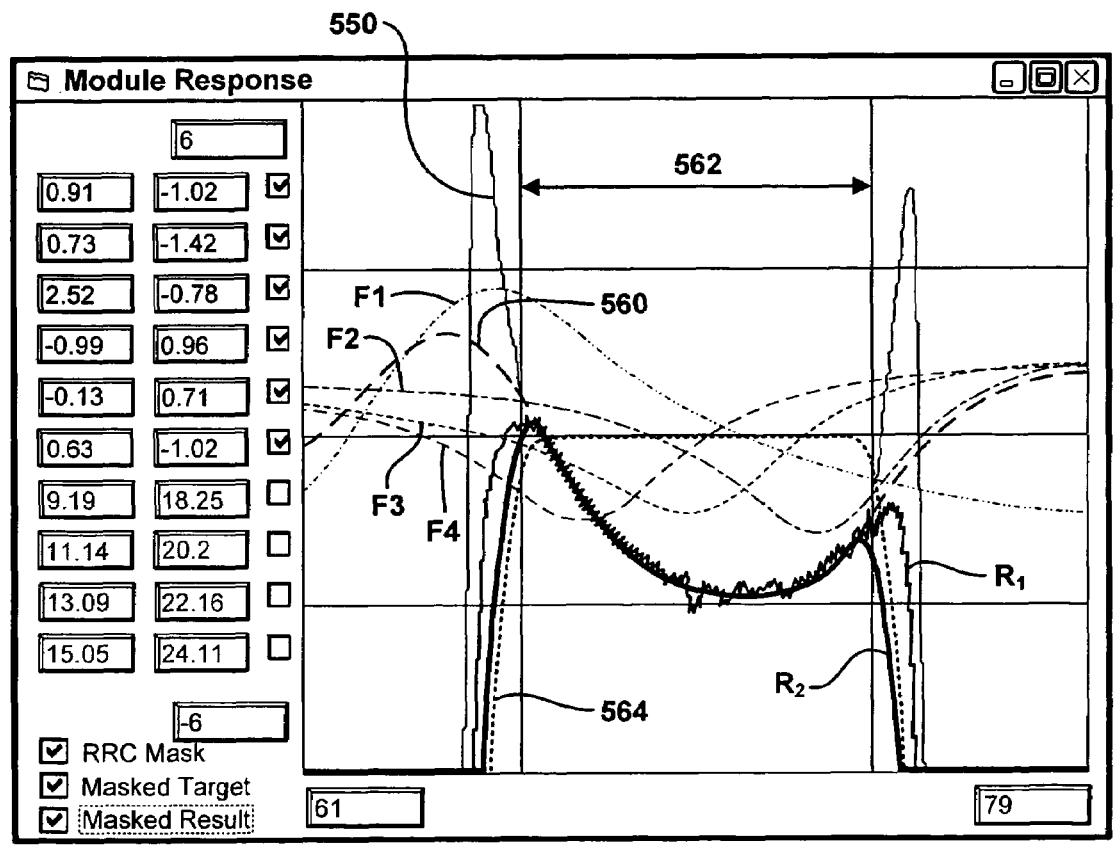
FIG. 17 is a screen view of a desired filter amplitude response versus a equalizer amplitude response, including the outputs of various filters.

Referring now to FIG. 17, the display shows the result of the least square fit between the finite impulse response from the filter box 550 and the equalizer circuit mathematical model frequency response 560. The least squares fit has been calculated within the frequency bandwidth of interest 562. The display also shows the individual filters F1 to F4 of the equalizer circuit which generate the total response 560 after their successive application. Line 564 corresponds to the square-root-cosine filter model provided by the modulator 42, added to assess the overall response of the modulator-equalizer system R1 in comparison with the overall response of the modulator-filter impulse response R1.

Figure 18:
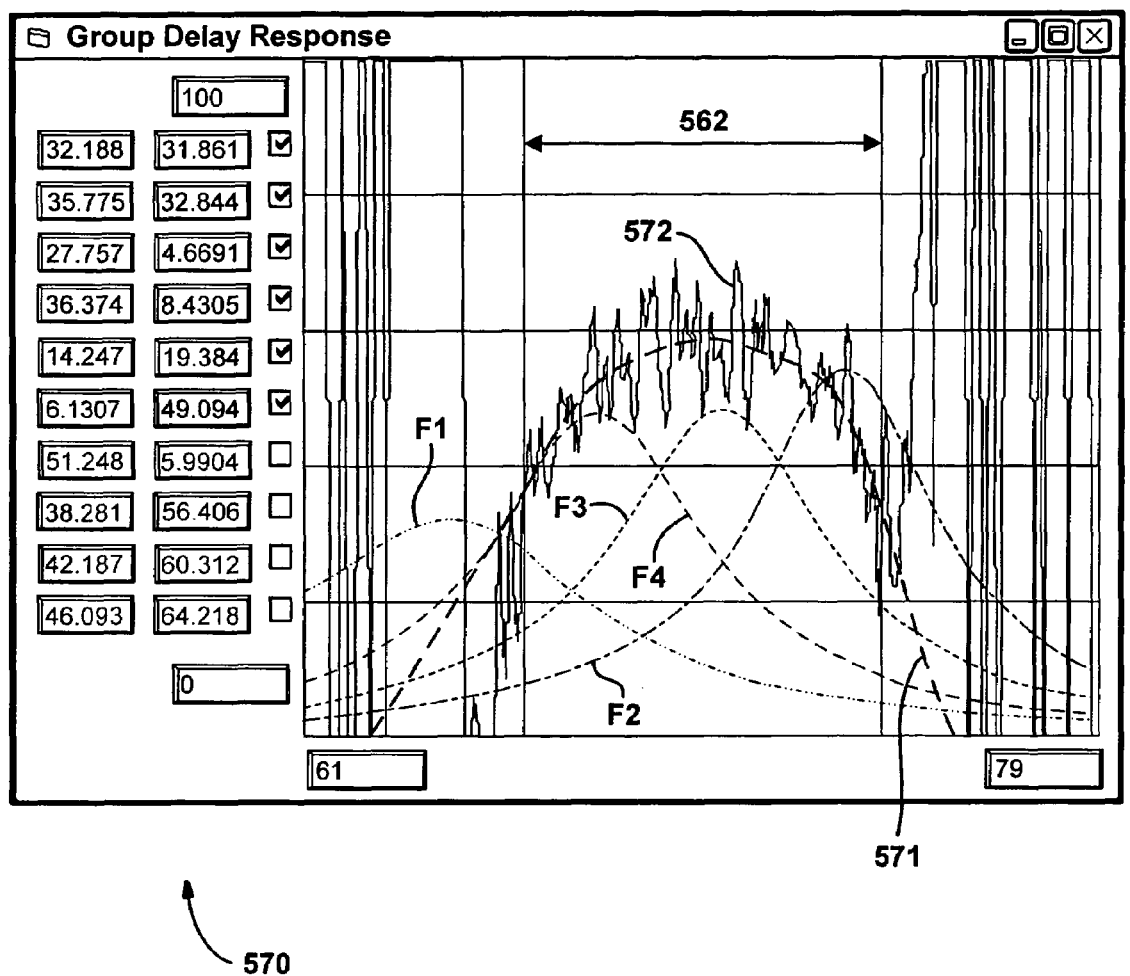
FIG. 18 is a screen view of a desired group delay response versus an equalizer group delay response, including the outputs of various filters.

Referring now to FIG. 18, the window 570 is illustrated with a matching of a group delay response. As above, the band pass is illustrated as 562. The output of the finite impulse response filter 550 of FIG. 17 is illustrated as line 572. Line 571 is the response of the group delay equalizer. The group delay of individual filters F is also illustrated.

Figure 19:
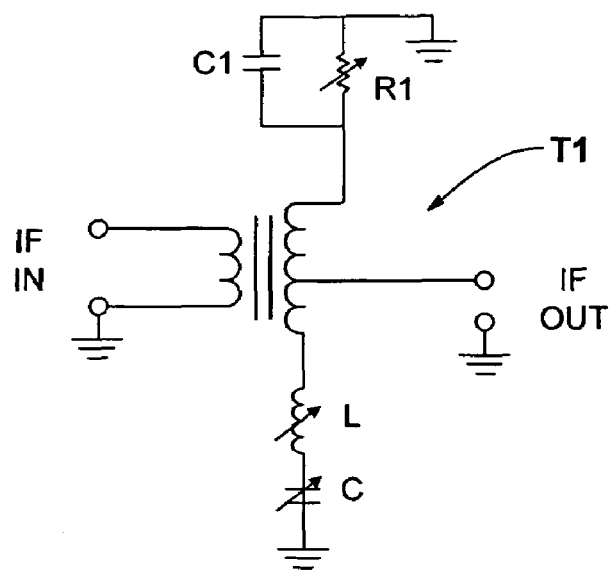
FIG. 19 is a schematic representation of an equalizer filter stage of an analog equalizer.

Referring now to FIG. 19, the filters $F_1$-$F_8$ correspond to the filters of the group delay equalizer that will be used. In the present embodiment, a Miteq VEQ Series of variable, intermediate frequency, delay and amplitude slope equalizers typically include eight sections, as described above. Each of them is a reflection type, second order, all-pass network. A transformer T1 having an IF in and an IF out is illustrated. The transformer at one end of the output transformer is coupled to a parallel circuit of a capacitor C1 of and a variable resistor R1, which are both coupled also to ground. The output is also coupled to a variable inductor L1 and a variable capacitor C. The variable capacitor C and variable inductor L are coupled in series to the transformer T1 and to ground. The transformer T1 loads a series resonant LC and the balanced components R1 and C1. The transformer T1 provides isolation between an amplitude-tuning elements R1, C1 and frequency-tuning elements L and C.

The transfer function of this circuit is as follows:

$$T(s) = \frac{(s^2 - (2Z_0 s/L) + 1/LC)}{2(s^2 + (2Z_0 s/L + 1/LC)}$$

The resonant frequency is:

$\omega_r = 1/sqr(LC)$ and $Q = \omega_r L/2Z_0$ where $Z_0$ is the load impedance.

In the circuit of FIG. 19, the central frequency and delay are controlled by the inductor L and the capacitor C, while the resistor R1 and capacitor C1 control the amplitude response shape and flatness. The tuning tool 552 of FIG. 17 has been set to use an intermediate frequency of 70 MHz.

Figure 20:
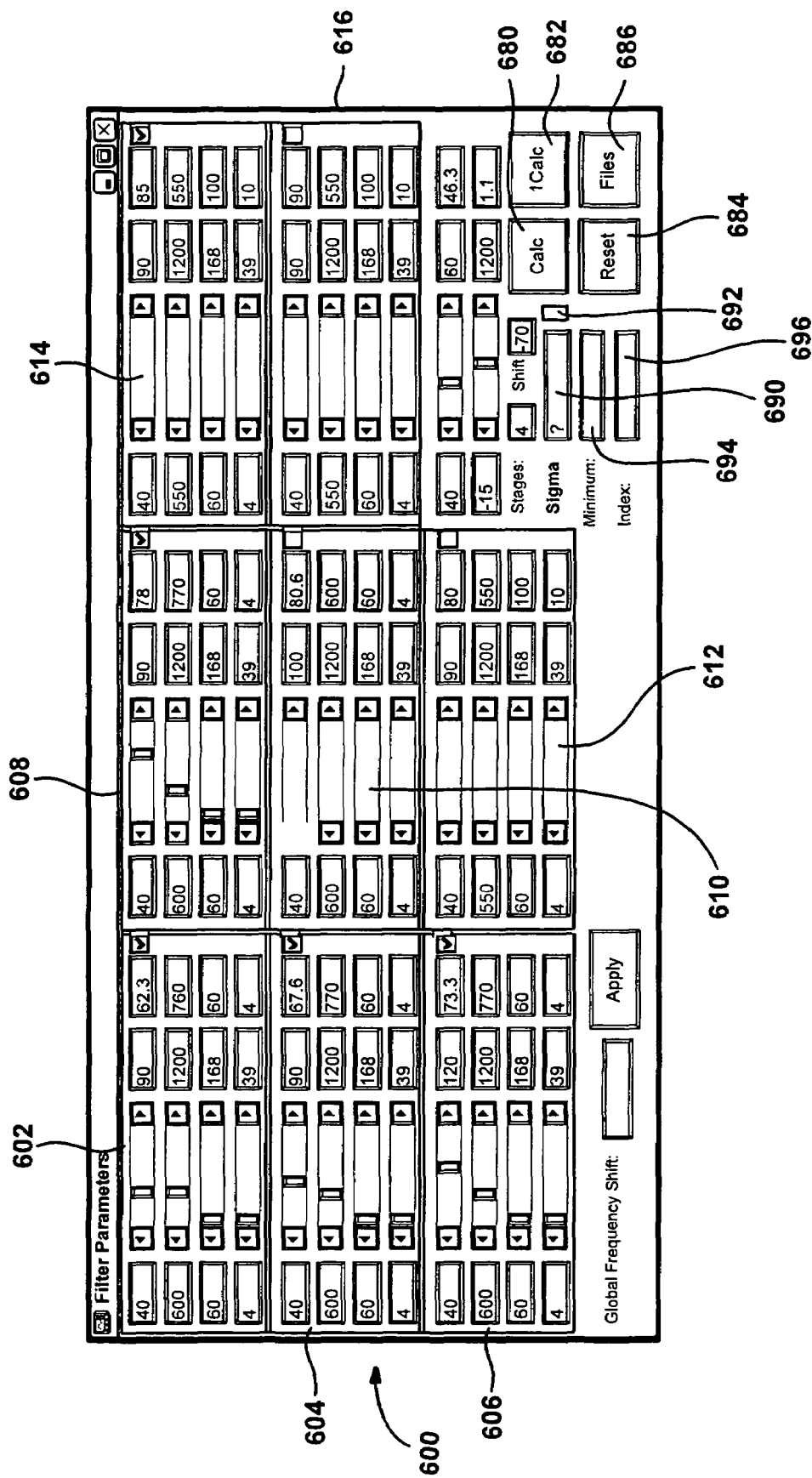
FIG. 20 is a screen view of a filter parameter window according to the present disclosure.

Referring now to FIG. 20, a filter parameter window 600 is illustrated, having window portions 602, 604, 606, 608, 610, 612, 614, and 616. Thus, eight window portions are illustrated. The present disclosure is able to synthesize an analog equalizer by matching the response of a cascade of 1-8 second order, all-pass filter sections according to the inverse response of the broadcast path. Each window portion 602-616 has various blocks of parameters corresponding to one filter section.

Each of the window portions 602-616 are used for parameter controls.

Figure 21:
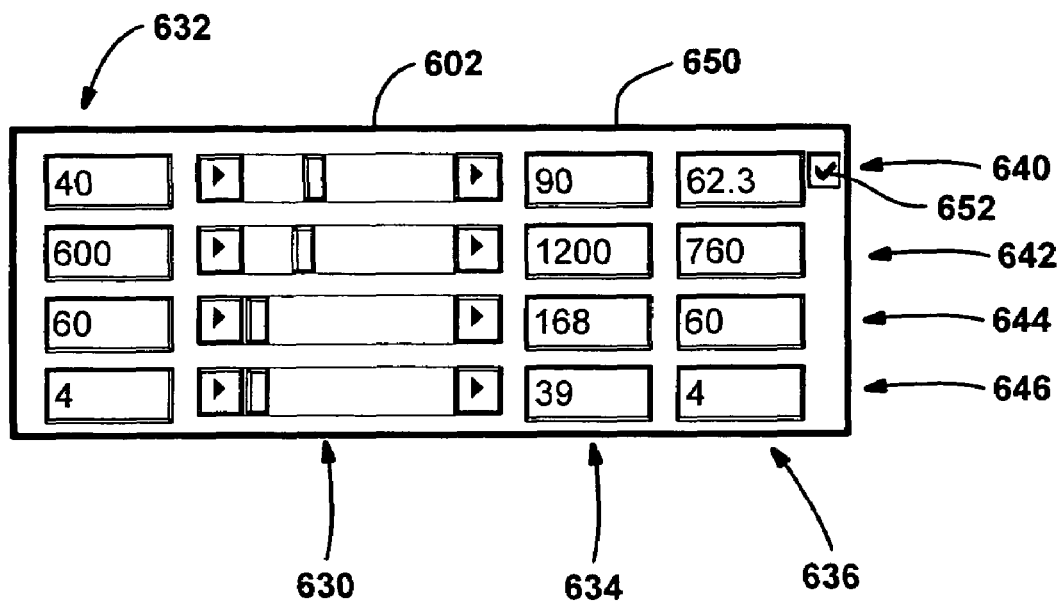
FIG. 21 is an enlarged view of a control section of FIG. 20.

Referring now to FIG. 21, one window portion 602 is illustrated. It should be noted that each of the window sections may be configured identically. Various slider controls are illustrated as column 630. The lower bounds of the parameters are illustrated in column 632 and the upper bounds, or maximum value, are illustrated in column 634. The current value of the slider is illustrated in column 636. Row 640 corresponds to the frequency in megahertz. Row 642 corresponds to the inductance of inductor L in nanohenries, row 644 corresponds to the resistance for R1 and row 646 corresponds to the resistance for C1. Each window portion 602-616 of FIG. 20 may be color coordinated with a border 650 to match the color of the output on the plot illustrated in FIG. 16.

A freeze box 652 may be provided. If the user selects the freeze box 652, the parameters remain fixed during the matching process. It should be noted that with regard to the other parameters, they will change as the program seeks the desired result.

There are various other controls that may modify the global response of the equalizer. One example is a gain change. A "gain change" changes the overall gain of the equalizer. It depends on the number of stages required to match the desired response. The typical value should be around 10 times the number of stages plus 10 dB within a range of +10 dB from the value. An overall group delay adjustment may also be provided. A shift, which is a negative integer, depends on the delay of the peak sample of the desired impulse response and the number of stages selected. As illustrated in window 600 of FIG. 20, a shift delay of −70 dB is set forth.

A global frequency shift command allows the shifting of the entire frequency response up or down a specific or specified amount in megahertz. When the "apply" button is selected, the entered value will be added to the central frequency parameter of the enabled sections. A positive value shifts the response up, while a negative one shifts the values down.

Referring back to FIG. 20, various command buttons 680, 682, 684, and 686 are illustrated, including a calc button 680. It is used to display the configuration window and starts the iterative matching process. The "1calc" button 682 advances the matching process one step forward. The reset button 684 resets all of the parameters to their original or initial default values. The files button 686 displays the file window to load or save configuration, status data and/or report files.

While the matching process is running, there are indicators to assist in determining how well the algorithm is performing. A sigma indicator box 690 represents the current matching error between the desired filter and the synthesized filter. Values around 1.0e-3 or below indicate a good match, even though under certain conditions values around 1.0e-2 could be acceptable. To the right of the sigma indicator box 690, a convergence direction indicator box 692 is set forth. A green light indicates the matching is converging and red indicates when it is diverging. When the matching indicator process reaches a region of very small or no change, a yellow indicator is illuminated in convergence direction indicator box 692. A yellow indicator with a low sigma value signal the end of the matching process. At each step of the iterative matching process, an entry in a status data log file is written. This log file can be loaded to restore the parameters to a known state, in case the matching starts diverging.

A minimum box 694 and an index box 696 show the minimum sigma since the last reset and its index in the status data log file. When the process reaches a minimum and then diverges, the indicators help find the last minimum point.

Also, during running of the process, the current status index may be shown in the caption bar of the parameter index, next to the file name.

Figure 22:
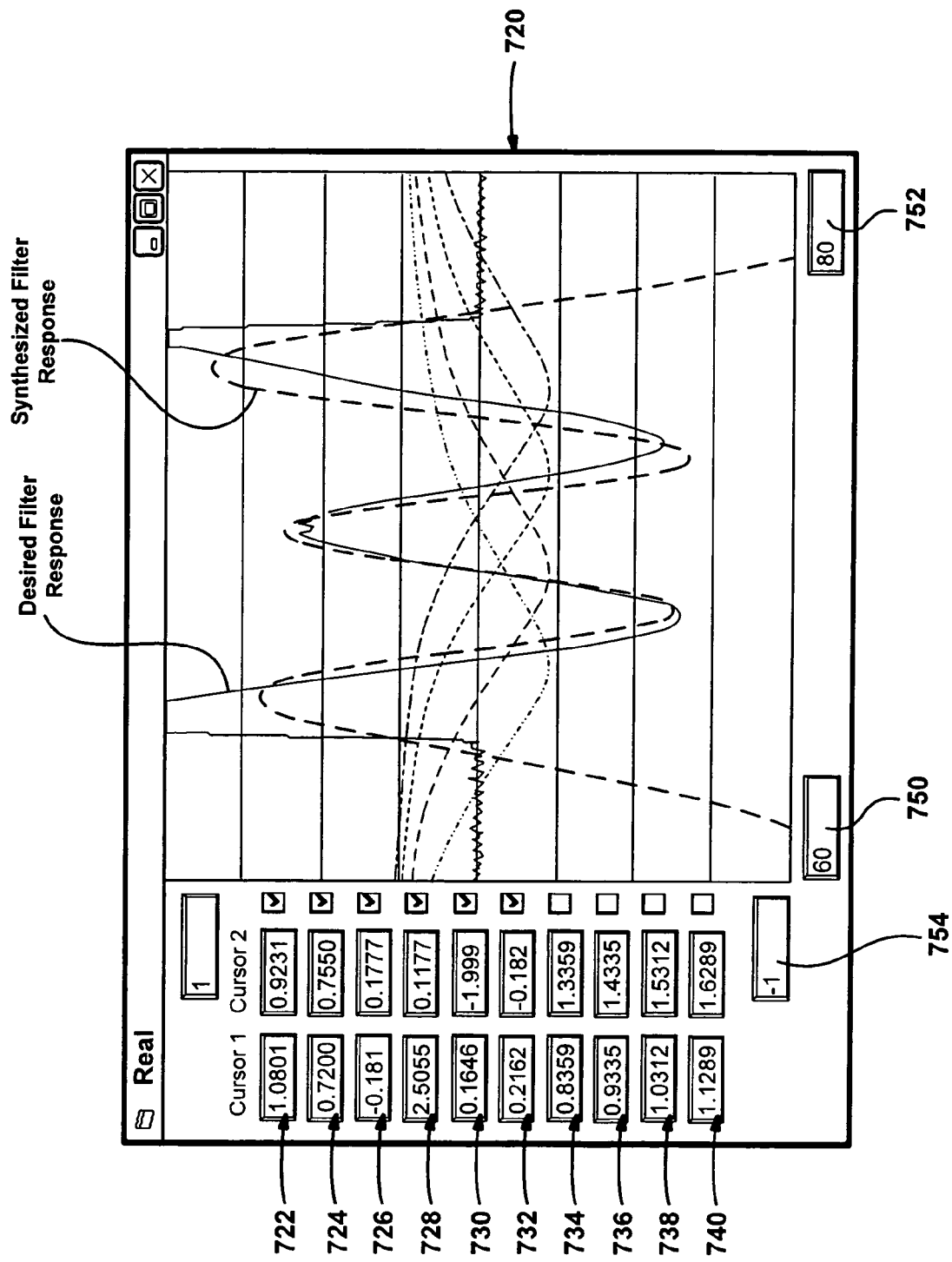
FIG. 22 is a screen view of a response window according to the present disclosure.

Referring now to FIG. 22, a window 720 illustrating a real part of the amplitude response is illustrated. It should be noted that the equalizer frequency response may have four various views, including a real part, imaginary part, modulus or magnitude, and the group delay. The module response is illustrated in FIG. 17 and the group delay response is illustrated in FIG. 18. It should be noted that row 722 corresponds to the desired filter and row 724 corresponds to the synthesizer filter in each of the windows. This allows the user to determine a match. Rows 726, 728, 730, 732, 734, 736, 738, and 740 illustrate the values of the various filter stages at the cursor positions 1 and 2. In this embodiment, there are four filter stages in the group delay equalizer. In a similar manner to the above, the desired response, the response calculated so far, the bandwidth, and the individual filter responses are illustrated. Boxes 750, 752 correspond to the bandwidth, and box 754 corresponds to the minimum Y-axis value.

Figure 23:
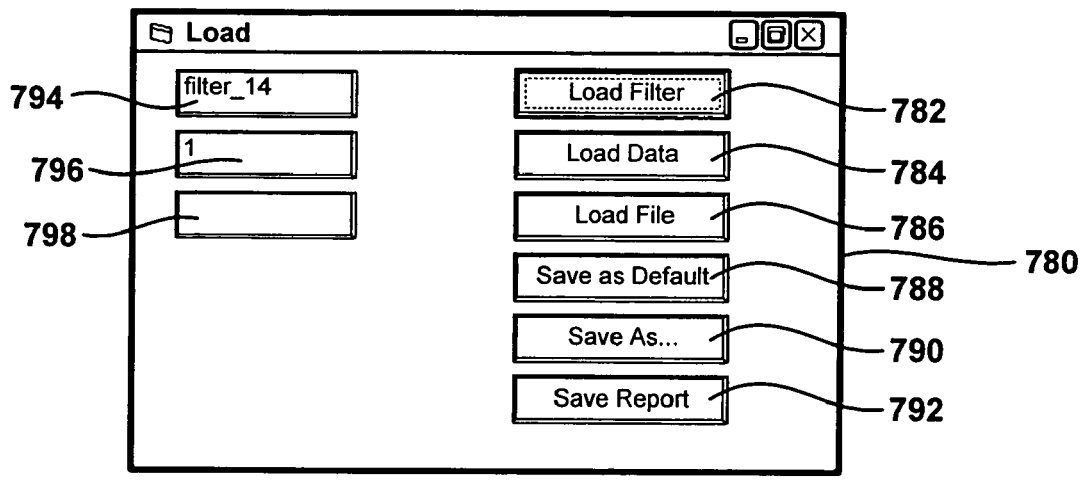
FIG. 23 is a screen view of a file window according to the present disclosure.

Referring now to FIG. 23, a file window 780 is illustrated. File window 780 includes a load filter button 782, a load data button 784, a load file button 786, a save-as default button 788, a save-as button 790, and a save report button 792. The load filter button 782 loads the desired filter response, prompts for a new filter file name and loads it. The load data button 784 loads the status data from the specific index position of the status data file. The save-as default button 788 saves the current parameter and configuration information as the new default configuration. The save-as button 790 saves the current parameter and configuration information under a different file name. The save report button 792 generates two reports containing the synthesized filter response and tuning curves for the individual sections. Box 794 includes the desired filter file name therein. The starting index for status is illustrated in box 796, and the configuration data file name is illustrated in box 798.

Figure 24:
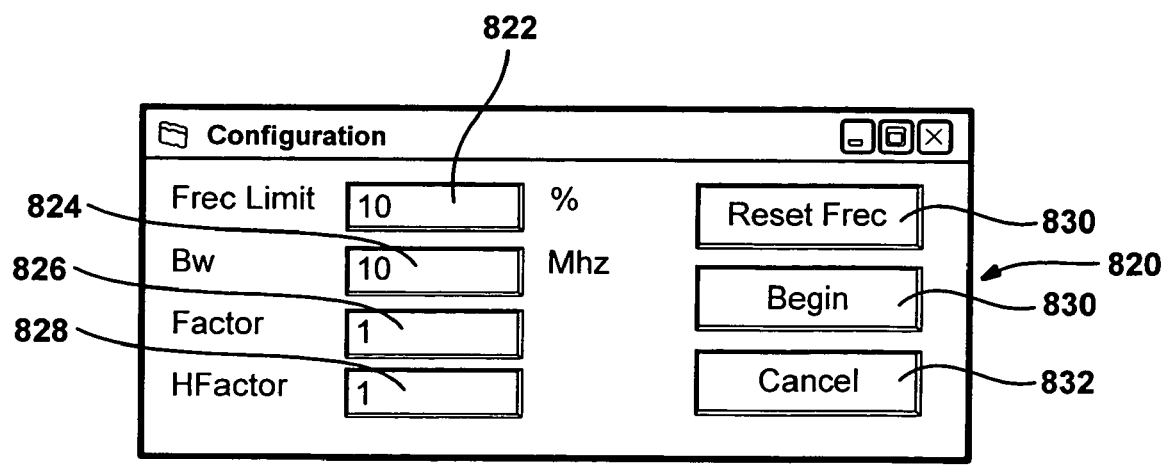
FIG. 24 is a screen view of a configuration window according to the present disclosure.

Referring now to FIG. 24, a configuration window 820 is illustrated. Window 820 includes a frequency limit box 822, a bandwidth setting box 824, a parameter factor box 826, and an H factor box 828. A configuration window may be generated automatically before starting the iterative process to allow the user to review or set some changes. The frequency limit box 822 is the range that a section frequency is allowed to move around its starting point. A reset button 830 resets the starting points to the current frequency value. The bandwidth setting box 824 controls the matching bandwidth. The desired filter and the synthetic one are only matched inside the range selected. The parameter box factor 826 and H factor box 828 control the convergence rate of the system. A begin box 831 initiates the process and a cancel box 832 cancels the process.

Figure 25:
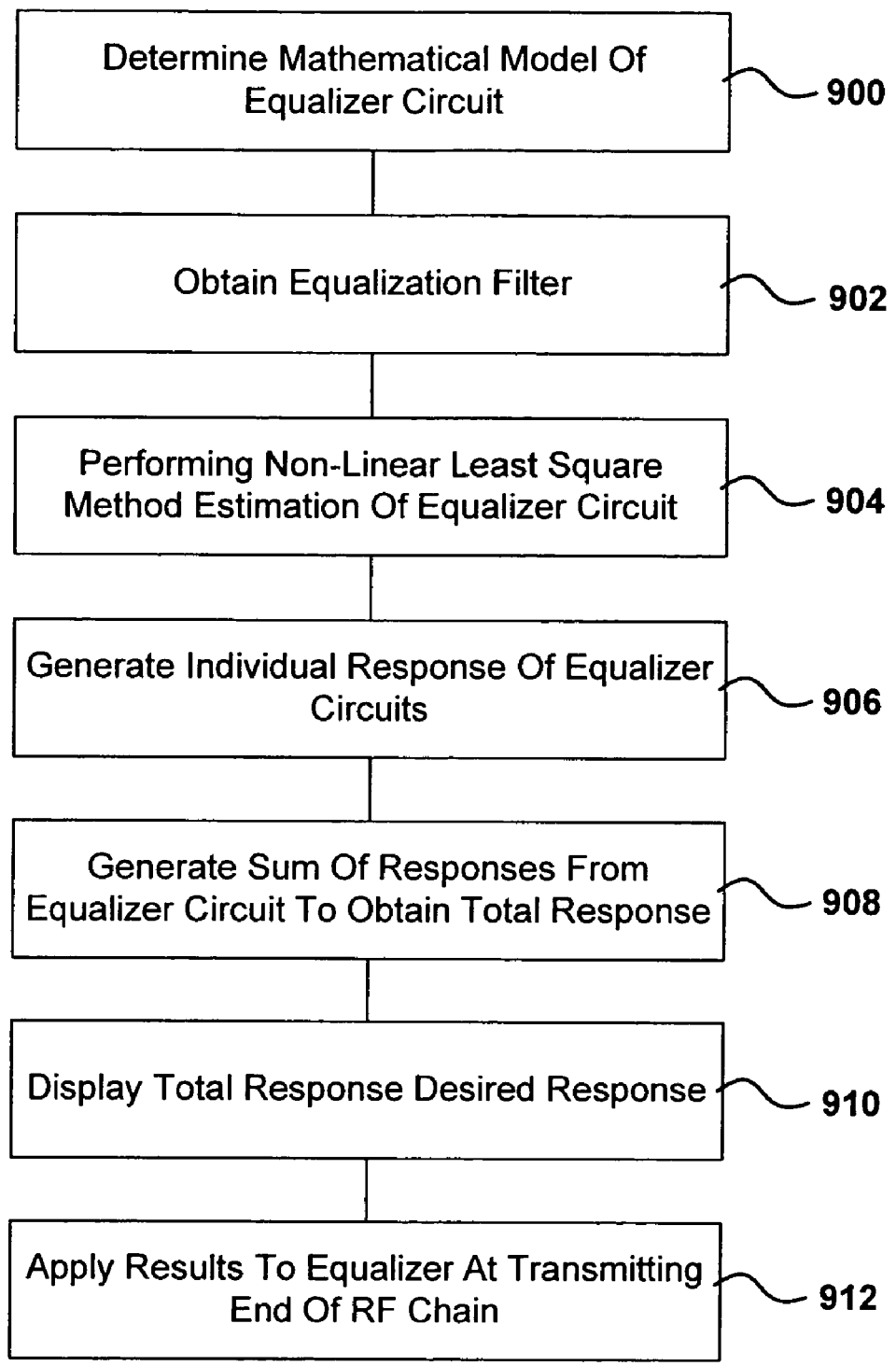
FIG. 25 is a flow chart of a method of configuring an analog equalizer according to the present invention.

Referring now to FIG. 25, a summary method of the above method for tuning a filter is illustrated. In Step 900, a mathematical model of the equalizer 48 of FIG. 1 is determined. As mentioned above, this may be saved in a computer.

In Step 902, the equalization filter is determined. Such a method may be determined as the inverse response in Step 522 of FIG. 15.

In Step 904, a non-linear least square method is performed on the equalizer circuit. As mentioned above, each of the mathematical models of each filter may be sequentially performed in Step 904. The processes also are performed iteratively, so that each of the least square method may be performed several times in order to conform the mathematical model to the desired function.

In Step 906, the individual response to the equalizer circuit is generated. In Step 908, the sum of the responses from the equalizer circuit is obtained to obtain the desired total response.

The desired total response may be displayed along with the response of each of the individual circuits. Parameters are also displayed so that the equalizer at the transmitting end of the system may be easily tuned. In Step 912, the results of Step 910 are applied to the equalizer at the transmitting end to reduce the distortion in various parts of the chain.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method of configuring an analog equalizer for a transmission link comprising:
    forming a mathematical model of an analog equalizer having a plurality of mathematical model filter stages;
    determining a desired response;
    tuning each of the plurality of mathematical model filter stages toward the desired response to form a plurality of tuned filter parameters to compensate for distortions in the transmission link;
    coupling an analog equalizer having a plurality of filter stages to an RF chain;
    configuring the analog equalizer in response to the plurality of tuned filter parameters; and
    broadcasting RF signals using the analog equalizer.

2. A method as recited in claim 1 wherein tuning each of the plurality of mathematical model filter stages comprises sequentially tuning each of the plurality of mathematical model filter stages.

3. A method as recited in claim 1 wherein tuning each of the plurality of mathematical model filter stages comprises iteratively tuning each of the plurality of mathematical model filter stages.

4. A method as recited in claim 3 wherein iteratively tuning each of the plurality of mathematical model filter stages comprises iteratively tuning using a non-linear least squares method.

5. A method as recited in claim 1 wherein the transmission link is an uplink.

6. A method as recited in claim 1 further comprising increasing a satellite transponder capacity by improving a signal-to-nose ratio in response to configuring.

7. A method as recited in claim 1 wherein determining a desired response comprises determining the desired response is determined in response to samples from a receiving device.

8. A method as recited in claim 7 wherein the receiving device comprising a satellite signal receiver.

9. A method as recited in claim 7 wherein the receiving device comprises an integrated receiver decoder.

10. A method as recited in claim 1 further comprising displaying the tuned filter parameters.

11. A method as recited in claim 1 wherein the plurality of tuned filter parameters comprises determining a sum of the mathematical filter stages.

12. A method as recited in claim 11 further comprising displaying the desired response and the sum of the mathematical filter stages.

13. A method as recited in claim 1 wherein displaying comprises displaying a frequency response.

14. A method as recited in claim 1 wherein displaying comprises displaying a group delay.

15. A system of equalizing an RF transmission chain including a transmission link comprising:
    a computer having a mathematical model of an analog equalizer with a plurality of mathematical model filter stages stored therein, said computer determining a desired response and tuning each of the plurality of mathematical model filter stages toward the desired response to form a plurality of tuned filters parameter to compensate for distortions in the transmission link; and
    analog equalizer having a plurality of filter stages, said analog equalizer coupled to the RF transmission chain for broadcasting signals and configured in response to the plurality of tuned filter parameters.

16. A system as recited in claim 15 wherein the computer sequentially tunes each of the plurality of mathematical model filter stages.

17. A system as recited in claim 15 wherein the computer tunes each of the plurality of mathematical model filter stages.

18. A system as recited in claim 15 wherein the computer iteratively tunes each of the plurality of mathematical model filter stages using a non-linear least squares system.

19. A system as recited in claim 15 wherein the computer determines a desired response in response to samples from a receiving device.

20. A system as recited in claim 19 wherein the receiving device comprising a satellite signal receiver.

21. A system as recited in claim 19 wherein the receiving device comprises an integrated receiver decoder.

22. A system as recited in claim 15 further comprising a display coupled to the computer displaying the tuned filter parameters.

23. A system as recited in claim 15 wherein the plurality of tuned filter parameters comprises determining a sum of the mathematical filter stages.

24. A system as recited in claim 15 further comprising a display coupled to the computer displaying the desired response and the sum of the mathematical filter stages.

25. A system as recited in claim 15 further comprising a display displaying a frequency response.

26. A system as recited in claim 15 further comprising a display coupled to the computer displaying a group delay.

* * * * *